(12) United States Patent
Uenaka et al.

(10) Patent No.: US 6,374,048 B1
(45) Date of Patent: Apr. 16, 2002

(54) DEVICE FOR CORRECTING A TREMBLE OF A FOCUSED IMAGE

(75) Inventors: Yukio Uenaka; Takamitsu Sasaki, both of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/545,466

(22) Filed: Apr. 7, 2000

(30) Foreign Application Priority Data

Apr. 9, 1999 (JP) .......................................... 11-102844
Apr. 12, 1999 (JP) .......................................... 11-104027

(51) Int. Cl.$^7$ .............................................. G03B 17/00
(52) U.S. Cl. ............................ 396/52; 396/55; 348/208
(58) Field of Search ............................. 396/52, 53, 54, 396/55; 348/208

(56) References Cited

U.S. PATENT DOCUMENTS

| | | |
|---|---|---|
| 4,996,545 A | 2/1991 | Enomoto et al. |
| 5,243,462 A | 9/1993 | Kobayashi et al. |
| 5,305,040 A | 4/1994 | Enomoto |
| 5,519,538 A | 5/1996 | Maruyama |
| 5,541,693 A | 7/1996 | Enomoto |
| 5,583,597 A | 12/1996 | Enomoto |
| 5,655,157 A | 8/1997 | Enomoto |
| 5,721,969 A | 2/1998 | Arai |
| 5,724,618 A * | 3/1998 | Miyamoto et al. ............. 369/55 |
| 5,809,346 A | 9/1998 | Fujisaki |
| 5,845,156 A * | 12/1998 | Onuki ........................... 396/52 |
| 5,909,242 A * | 6/1999 | Kobayashi et al. .......... 348/208 |

FOREIGN PATENT DOCUMENTS

| | | |
|---|---|---|
| JP | 5-113595 | 5/1993 |
| JP | 7-199263 | 8/1995 |

* cited by examiner

*Primary Examiner*—Russell Adams
*Assistant Examiner*—Arthur A Smith
(74) *Attorney, Agent, or Firm*—Greenblum & Bernstein P.L.C.

(57) ABSTRACT

A movement of an optical axis of a photographing optical system due to a focused image tremble is detected as a displacement on a focal plane. An object image is formed on the focal plane by the photographing optical system, and when an optical axis of a correction lens is coaxial with an optical axis of other optical systems included in the photographing optical system, the optical axis of the photographing optical system pierces through a center of the focal plane. On the focal plane, a correctable range of the correction lens is defined based on a structure of a correction device. An original point of the correctable range is the center of the focal plane. If a focused image tremble occurs out of the correctable range, an intersection of a boundary of the correctable range and a straight line connecting a position of the optical axis of the photographing optical system and the original point is calculated. The optical axis of the photographing optical system is supposed to be moved to the intersection, then the correction of the focused image tremble is carried out.

7 Claims, 22 Drawing Sheets

DEVICE FOR CORRECTING A TREMBLE OF A FOCUSED IMAGE

BACKGROUND OF THE INVENTION

1. Field of the Invention

The present invention relates to a device for correcting a tremble of a focused image of an object caused by an oscillation of an optical device due to, for example, a hand tremble.

2. Description of the Related Art

Conventionally, there is known an optical device, for example, a camera or binoculars, with which a correction device, for correcting a focused image tremble due to for example a hand tremble and so on, is provided. An amount of a tremble of the optical device is detected by the correction device. The correction device drives a correcting optical system such that the amount of the tremble is canceled. Namely, the correction optical device is driven following the focused image tremble.

There is a correctable range of the correction optical system, which is defined by a structure of a driving device of the correction optical system. When the focused image tremble occurs out of the correctable range, it is impossible to drive the correction optical system so as to follow the focused image tremble. Accordingly, the correction lens is stopped if the focused image tremble occurs out of the correctable range, and the correction optical system remains stopped while the situation in which the focused image tremble is out of the correctable range continues.

When the focused image tremble returns within the correctable range, the driving of the correction optical system is restarted. However, before the correction optical system can be driven so as to follow the focused image tremble, the correction optical system must be moved from the position at which it stopped when the focused image tremble extended beyond the correctable range. Accordingly, between the moment at which the focused image tremble returns within the correctable range and a moment at which the correction optical system restarts to follow the focused image tremble, there is an expected time lag. Therefore, the effectiveness of the correction of the focused image tremble is extremely reduced.

Further, there are some cameras in which the correction of the focused image tremble is carried out before an exposure period. The correction of the focused image tremble should be most effectively carried out during the exposure period. Nevertheless, if a relatively large focused image tremble occurs before the exposure period and the correction optical system is driven close to a boundary of the correctable range, a range, in which the correction optical system is able to be driven during the exposure period, is extremely limited. Accordingly, the effectiveness of the correction of the focused image is not high enough during the exposure period, so that a quality of a photographed image is lowered.

SUMMARY OF THE INVENTION

Therefore, an object of the present invention is to provide a device for correcting the focused image tremble, in which the correction is restarted in an instant when the focused image tremble returns within the correctable range. Further, another object of the present invention is to provide a device for correcting the focused image tremble, in which the effectiveness of the correction is sustained during a period of recording an object image even if the large focused image tremble occurs while the object image is not being recorded.

In accordance with an aspect of the present invention, there is provided a device for correcting a tremble of a focused image comprising: a tremble detector that detects a direction and a quantity of a tremble of an optical device; a correction optical system that is included in an imaging optical system and corrects a tremble of an optical image which is imaged by the imaging optical system; a driving device that drives the correction optical system; a tremble position detector that detects an actual tremble position on a focal plane, through which an optical axis of other optical systems included in the imaging optical system pierces and on which the optical image is imaged by the imaging optical system, the actual tremble position being moved in accordance with the tremble of the optical device, the optical axis of the other optical systems piercing through a center of the focal plane, when an optical axis of the correction optical system is positioned at an original point at which the optical axis of the correction optical system is coaxial with the optical axis of the other optical systems; a controlling system that calculates driving data of the correction optical system based on the actual tremble position in order to cancel the tremble, and controls the driving device based on the driving data; and a judging system that judges whether the actual tremble position is within a correctable range on the focal plane, which is defined by the controlling system.

If the judging system judges that the actual tremble position is out of the correctable range, an intersection, of a boundary of the correctable range and a straight line connecting the center of the focal plane and the actual tremble position, is supposed to be a tremble position by the controlling system, and the controlling system calculates driving data of the correction optical system based on the supposed tremble position.

Preferably, the correctable range is defined as an area bounded by a trace of positions at which the correction optical system is driven as far as possible from the original point.

Preferably, the correctable range is set to be smaller than a range, a boundary of which is defined by a trace of positions at which a supporting member of the correction optical system is not movable, being in contact with other members of the optical device.

Preferably, the correctable range is a circle, a center of which is the original point.

Preferably, the judging system judges whether the actual tremble position is within the correctable range by comparing a length between the actual tremble position and the original point with a radius of the circle.

Preferably, when the controlling system calculates a displacement to the intersection of the supposed tremble position, the controlling system extracts direction data which indicates a direction to the actual tremble position, calculates only a quantity of the displacement to the intersection based on a displacement to the actual tremble position out of the correctable range, and adds the direction data to the quantity of the displacement to the intersection.

In accordance with another aspect of the present invention, there is provided a device for correcting a tremble of a focused image comprising: a tremble detector that detects a direction and a quantity of a tremble of an optical device; a correction optical system that is included in an imaging optical system and corrects a tremble of an optical image which is imaged by the imaging optical system; a driving device that drives the correction optical system; a tremble position detector that detects an actual tremble position on a focal plane, through which an optical axis of other optical systems included in the imaging optical system pierces and on which the optical image is imaged by the imaging optical system, the actual tremble position being moved in accordance with the tremble of the optical device, the optical axis of the other optical systems piercing through a center of the focal plane, when an optical axis of the correction optical system is positioned at an original point at which the optical axis of the correction optical system is coaxial with the optical axis of the other optical systems; a controlling system that calculates driving data of the correction optical system based on the actual tremble position in order to cancel the tremble, and controls the diving device based on the driving data; and a judging system that judges whether the actual tremble position is within a correctable range on the focal plane, which is defined by the controlling system.

If the judging system judges that the actual tremble position is out of the correctable range, a point on a boundary of the correctable range, which is closest to the actual tremble position, is supposed to be a tremble position by the controlling system, the controlling system controlling the driving system such that a displacement of the optical axis of the other optical systems to the supposed tremble position is able to be canceled.

In accordance with another aspect of the present invention, there is provided a device for correcting a tremble of a focused image, that is provided for a camera including a photographing optical system, and a photographing control system which records an optical image, imaged on a photographing medium, on the photographing medium by controlling an imaging capturing operation comprising: a tremble detector that detects a direction and a quantity of a tremble of the camera; a correction optical system that is included in the photographing optical system and corrects a tremble of the optical image; a driving device that drives the correction optical system; a tremble position detector that detects a tremble position on a focal plane, through which an optical axis of other optical systems included in the photographing optical system pierces and on which the optical image is imaged by the imaging optical system, the position being moved in accordance with the tremble of the camera, the optical axis of the other optical systems piercing through a center of the focal plane, when an optical axis of the correction optical system is position at an original point at which the optical axis of the correction optical system is coaxial with the optical axis of the other optical systems; and a controlling system that calculates driving data of the correction optical system based on the tremble position in order to cancel the tremble, and controls the driving device based on the driving data.

The controlling system controls the driving device such that a first correctable range, of the correction optical system on the focal plane under a first state in which the camera is under a standby state, is smaller than a second correctable range, of the correction optical system on the focal plane under a second state in which the camera is under an image capturing state.

Preferably, the second correctable range is defined as an area bounded by a trace made by driving the correction optical system so as to be positioned as far as possible from the original point.

Preferably, the second correctable range is set to be smaller than a range, a boundary of which is defined by a trace of positions at which a supporting member of the correction optical system is not movable, being in contact with other members of the camera.

Preferably, the first correctable range and the second correctable range are a circle, a center of which is the original point.

Preferably, if the tremble is out of the first correctable range under the first state, the correction optical system is stopped, and the correction optical system is restarted to be driven for correcting the tremble from a position at which the correction optical system was stopped, when the image capturing operation begins.

Preferably, the photographing control system further comprises a photometric device that carries out a photometric operation in accordance with an operation of an operating member mounted on the camera, and the correction optical system is driven within the first correctable range during a period in which the photometric operation is being carried out.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
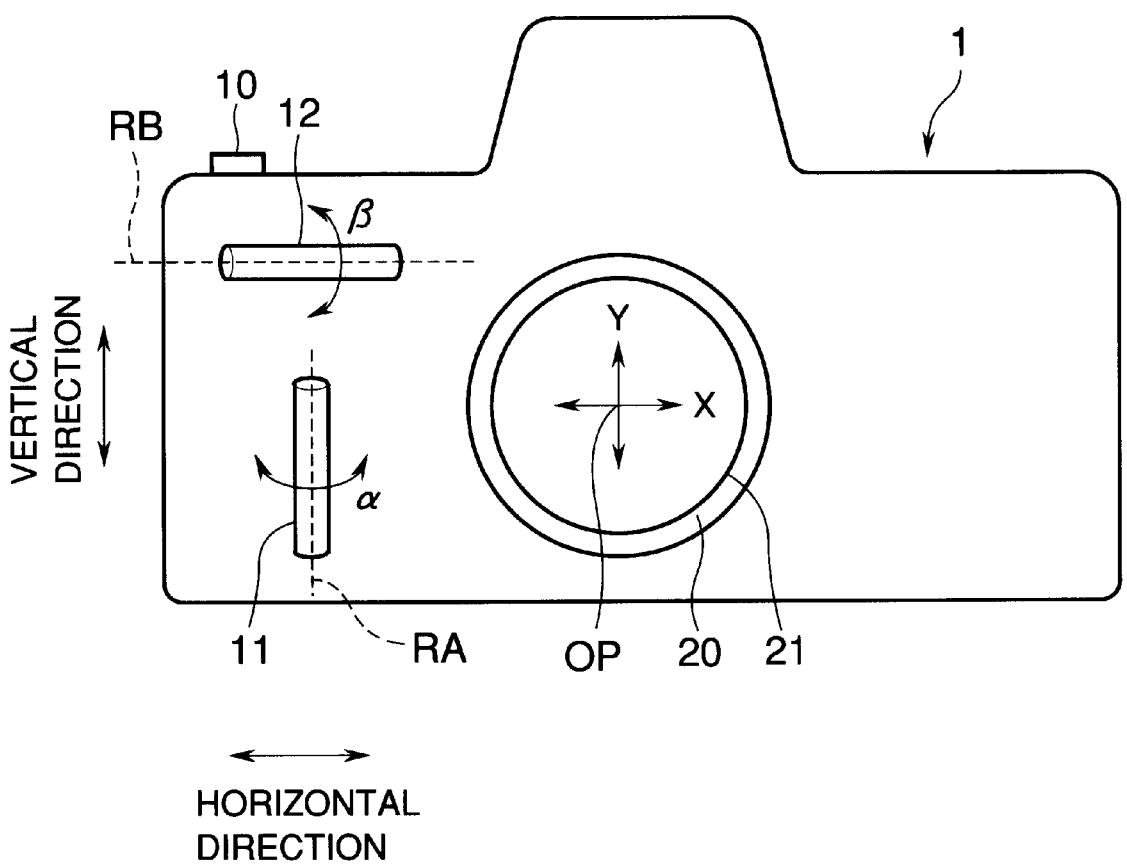
FIG. 1 is a front view of a camera, to which a first embodiment, according to the present invention, is applied.

The present invention will now be described with reference to embodiments shown in the drawings.

FIG. 1 is a front view of a camera 1, to which a first embodiment, according to the present invention, is applied. In FIG. 1, some members are depicted conceptually.

A shutter button 10 is provided on an upper surface of the camera 1. The shutter button 10 can be pushed by one step to initiate a photometry operation, and can be pushed by two steps to initiate a release sequence. In a body of the camera 1, angular speed sensors 11 and 12 are placed on a side at which the shutter button 10 is positioned. Each of the angular speed sensors 11, 12 is a gyro sensor, which detects an angular speed in a rotational direction around its longitudinal axis. The angular speed sensors 11 and 12 are placed in such a manner that a rotational axis RA of the angular speed sensor 11 and a rotational axis RB of the angular speed sensor 12 are at right angles to each other. When the camera 1 is held in a usual position, namely, when the camera 1 is held horizontally, the rotational axis RA is extended along a lengthwise-axis Y which is parallel to the vertical direction, and the rotational axis RB is extended along a lateral-axis X which is parallel to the horizontal direction.

By the angular speed sensors 11 and 12, an angular speed of an optical axis OP of a photographing optical system 21 mounted in a lens barrel 20 is detected. The angular speed of the optical axis OP in a rotational direction α around the rotational axis RA is detected by the angular speed sensor 11. The angular speed of the optical axis OP in a rotational direction β around the rotational axis RB is detected by the angular speed sensor 12.

Note that, a plurality of optical systems is included in the photographing optical system 21, although the photographing optical system 21 is depicted as a single lens, in FIG. 1.

Figure 2:
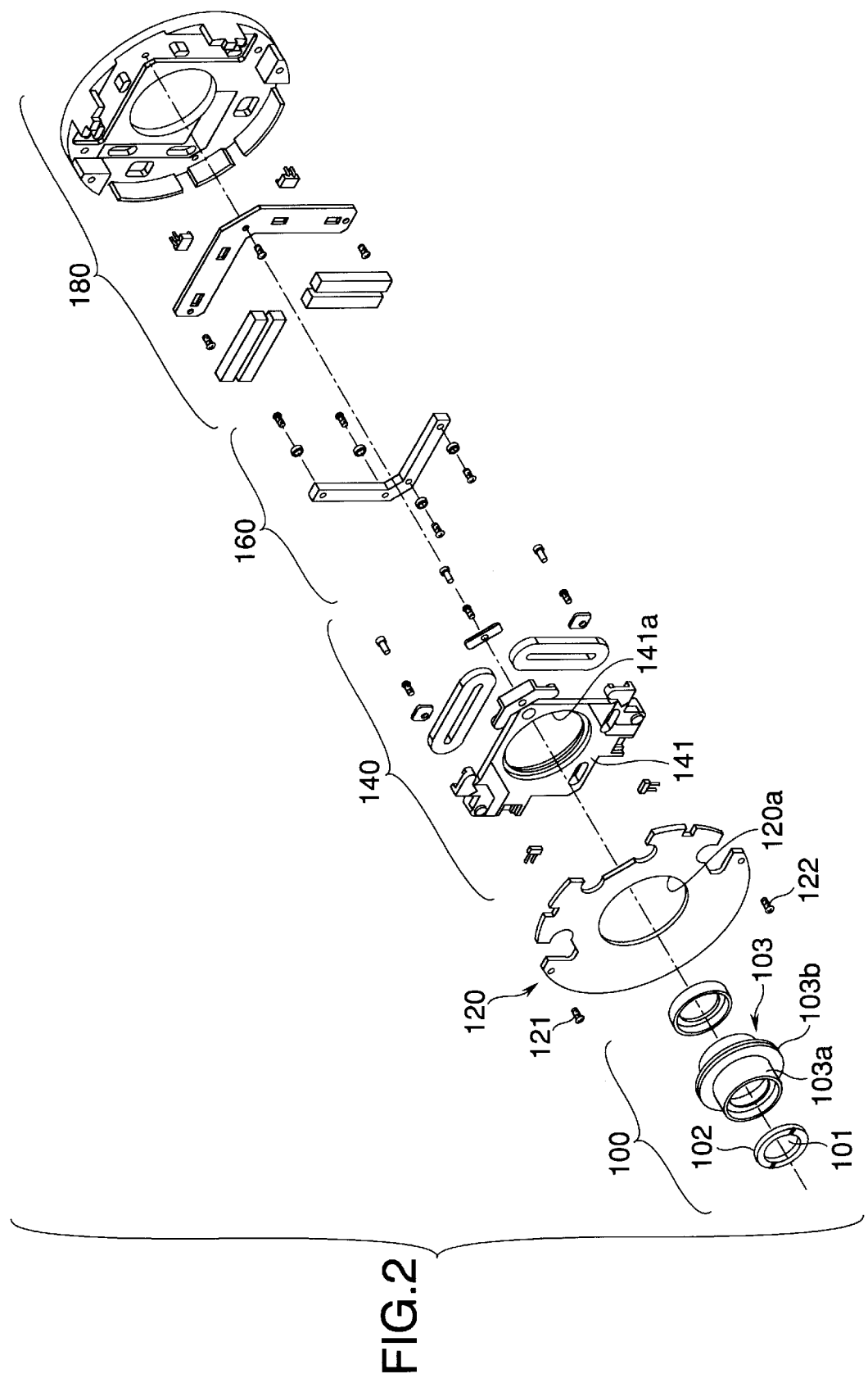
FIG. 2 is an exploded perspective view of a correction apparatus, which is mounted in the camera.

FIG. 2 is an exploded perspective view, wholly showing a correction apparatus, to which the first embodiment is applied.

A correction lens 101 is supported by a lens supporting frame 102. As described above, the photographing optical system 21 consists of the correction lens 101 and other optical systems. A correction lens barrel 103 includes a small diameter portion 103a and a large diameter portion 103b. The lens supporting barrel 102 is held in the small diameter portion 103a. The lens supporting frame 102 and the correction lens barrel 103 are part of a mechanism 100 that supports the correction lens 101. Male threads are formed on an outer surface of the large diameter portion 103b. An opening portion 120a is formed in a first fixing member 120, and an opening portion 141a is formed in a lens barrel supporting frame 141 of a movable member 140. The large diameter portion 103b is engaged with the opening portion 141a of the movable member 140, being inserted through the opening portion 120a of the first fixing member 120. The first fixing member 120 is fixed to a second fixing member 180 by screws 121 and 122. The movable member 140 and a guide member 160 are held by the first fixing member 120 and a second fixing member 180, by being located between the first and second members 120, 180.

Figure 3:
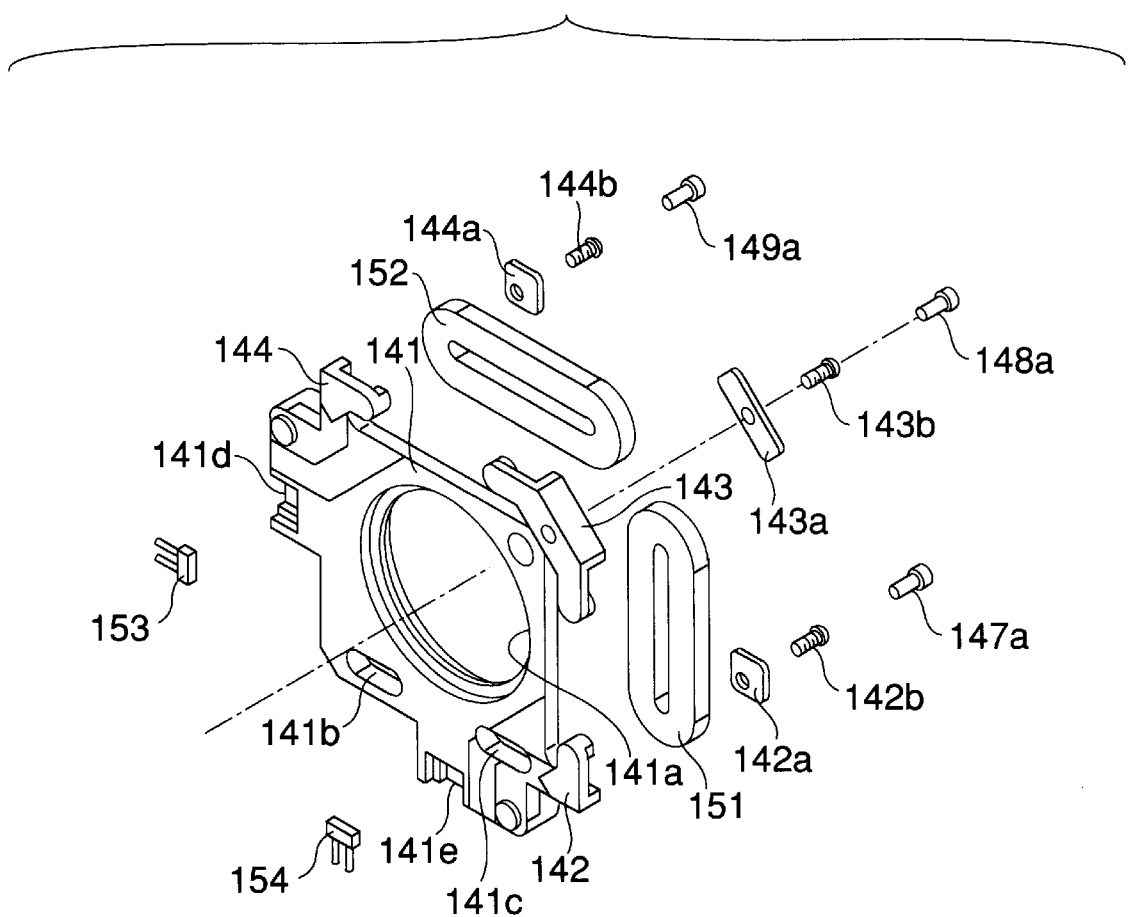
FIG. 3 is an exploded perspective view of a movable member of the correction apparatus.

FIG. 3 is an exploded enlarged perspective view of the movable member 140. An opening portion 141a is formed in the lens barrel supporting frame (or member) 141 which is generally rectangle-shaped. Female threads are formed on an inner surface of the opening portion 141a. The male threads of the large diameter portion 103b (see FIG. 2) are threadingly engaged with the female threads of the lens barrel supporting frame (or member) 141. Namely, the large diameter portion 103b is fixed to the opening portion [104a] 141a. Coil fixing frames 142, 143 and 144 are respectively fixed at corners of the lens barrel supporting frame 141.

A lateral-axis driving coil 151 is positioned by the coil fixing frames 142 and 143. One end of the coil 151 is held between the coil fixing frame 142 and a coil pressing member 142a, and another end of the coil 151 is held between the coil fixing frame 143 and a coil pressing member 143a. The coil pressing member 142a is fixed on the coil fixing member 142 by a screw 142b and the coil pressing member 143a is fixed on the coil fixing member 143 by a screw 143b, so that the driving coil 151 is fixed.

A lengthwise-axis driving coil 152 is positioned by the coil fixing frames 143 and 144. One end of the coil 152 is held between the coil fixing frame 143 and the coil pressing member 143a, and another end of the coil 152 is held between the coil fixing frame 144 and a coil pressing member 144a. The coil pressing member 143a is fixed on the coil fixing member 143 by the screw 143b and the coil pressing member 144a is fixed on the coil fixing member 144 by a screw 144b, so that the driving coil 152 is fixed.

Lateral-axis guide holes 141b and 141c are formed at a lower periphery portion of the lens barrel supporting frame 141. Longitudinal axes of the lateral-axis guide holes 141b, 141c are parallel to the horizontal direction. The lateral-axis guide holes 141b, 141c are formed such that a base portion of each inner wall surface of the lateral-axis guide holes 141b, 141c lies on a same plane.

An LED (Light Emitting Diode) 153, which is a light emitting element, is positioned in a concave portion 141d which is formed at a side periphery portion of the lens barrel supporting frame 141, opposite to a side periphery portion at which the coil fixing frames 142 and 143 are positioned. An LED 154 is positioned in a concave portion 141e which is formed at the lower periphery portion of the lens barrel supporting frame 141.

Figure 4:
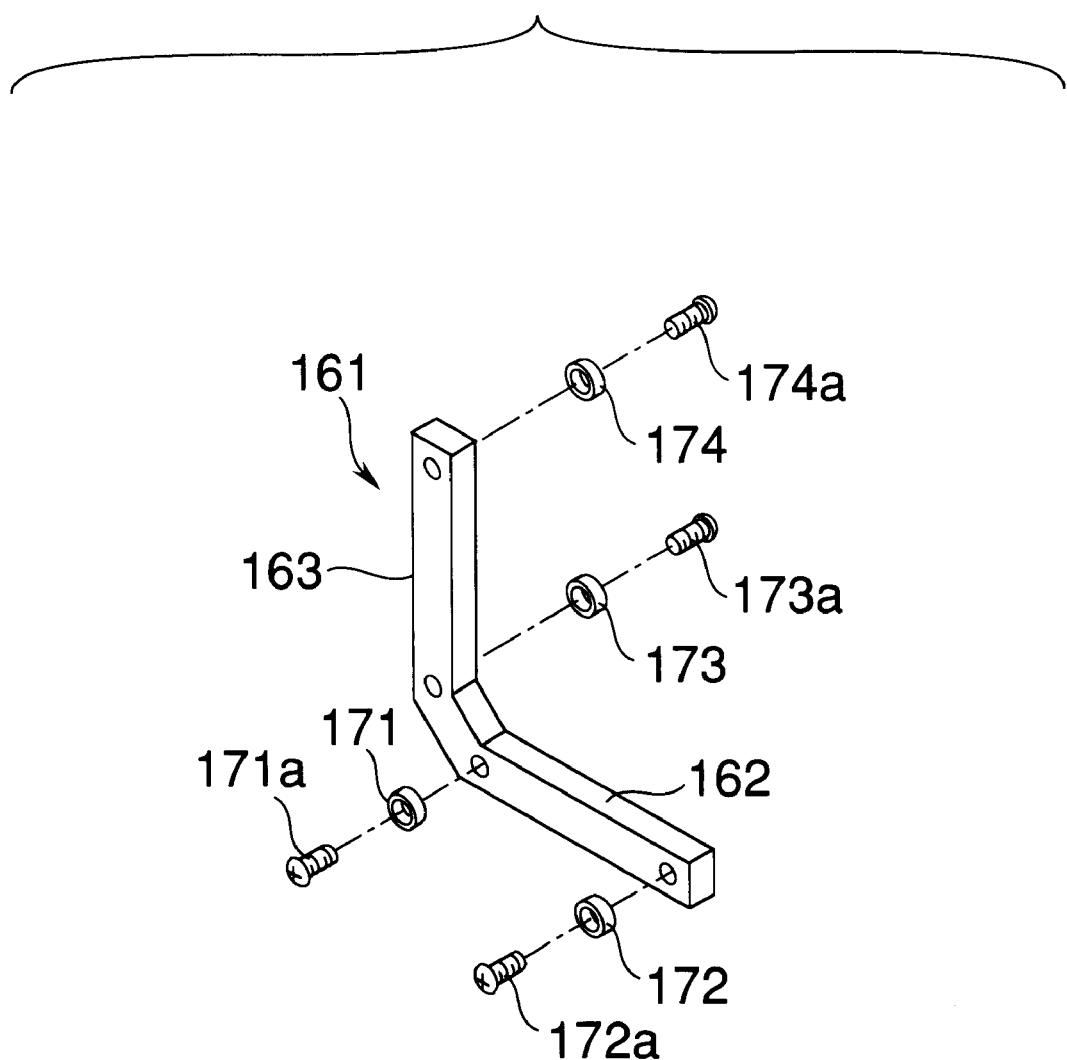
FIG. 4 is an exploded perspective view of a guide member of the correction apparatus.

FIG. 4 is an exploded perspective view of the guide member 160, being enlarged. A guide bar 161 is provided with arms 162 and 163, longitudinal axes of which cross at a right angle. Namely, the guide bar 161 is generally L-shaped. Rollers 171 and 172, which are cylindrical, are mounted on a side surface of the arm 162, which is on the side of the movable member 140. A screw 171a is pierced through the roller 171, and engaged with a hole formed at an end portion, which is close to the arm 163, on the side surface of the arm 162, so that the roller 171 is fixed on the arm 162. A screw 172a is pierced through the roller 172, and engaged with a hole formed at another end portion on the side surface of the arm 162, so that the roller 172 is fixed on the arm 162.

Rollers 173 and 174, which are cylindrical, are mounted on a side surface of the arm 163, which is on the side of the second fixing member 180. A screw 173a is pierced through the roller 173, and engaged with a hole formed in an end portion, which is close to the arm 162, on the side surface of the arm 163, so that the roller 173 is fixed on the arm 163. A screw 174a is pierced through the roller 174, and engaged with a hole formed at another end portion on the side surface of the arm 163, so that the roller 174 is fixed on the arm 163.

Figure 5:
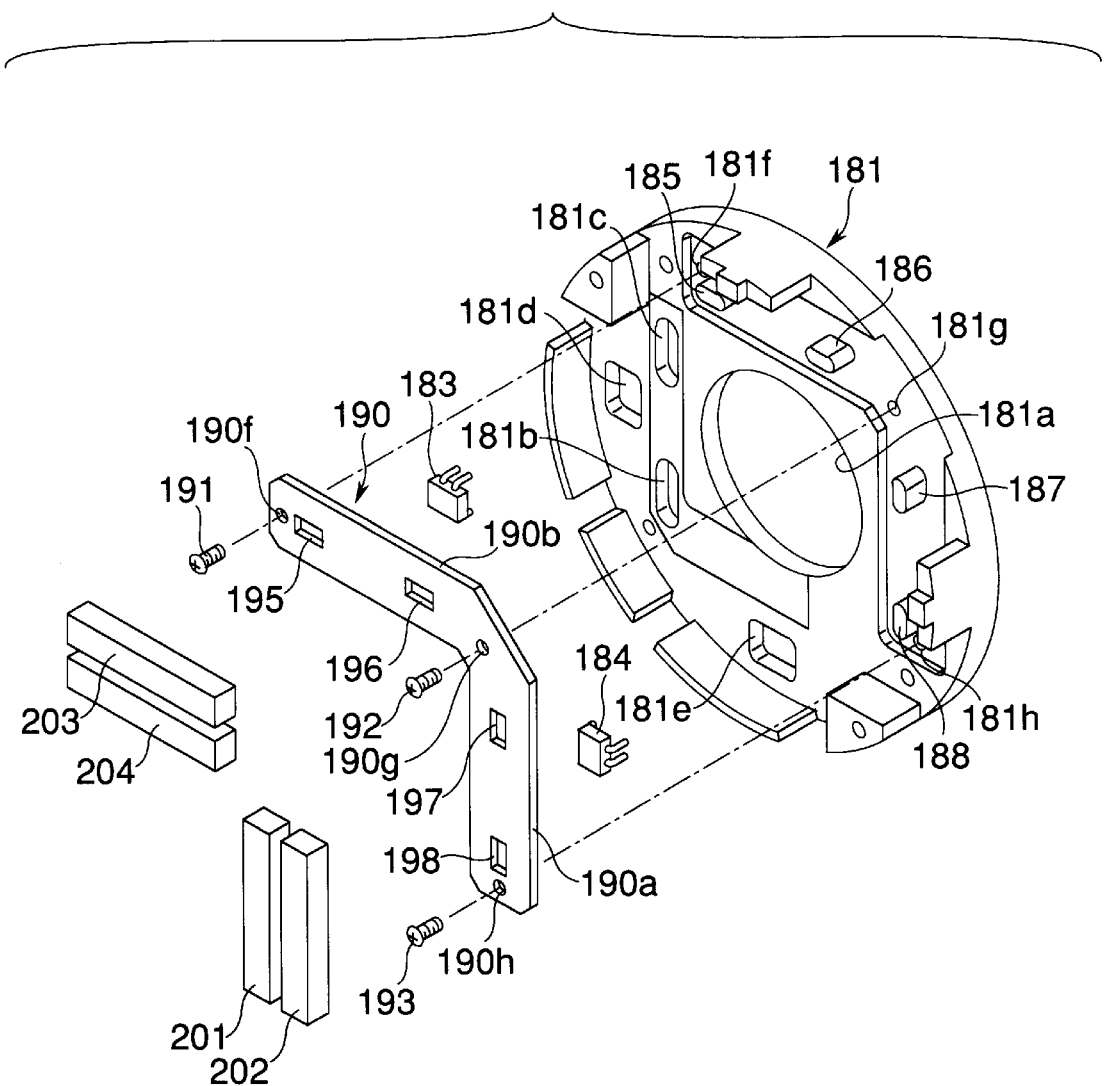
FIG. 5 is an exploded perspective view of a second fixing member of the correction apparatus.

FIG. 5 is an exploded perspective view of the second fixing member 180, being enlarged. A base body 181 is a generally circular plate. An opening portion 181a is formed in an approximate center of the base body 181. The correction lens barrel 103 (see FIG. 2) is inserted through the opening portion 181a. The diameter of the opening portion 181a is greater than the diameter of the correction lens barrel 103. Accordingly, the correction lens barrel 103 is movable in the opening portion 181a in accordance with a correction control of the focused image tremble described below. In other words, a driving range of the correction lens barrel 103 is defined by the opening portion 181a.

Lengthwise-axis guide holes 181b and 181c are formed close to the opening portion 181a, being positioned in the lengthwise axis. The longitudinal axes of the lengthwise-axis guide holes 181b, 181c are parallel to the vertical direction. The lengthwise-axis guide holes 181b, 181c are formed such that a base portion of each inner wall surface of the lengthwise-axis guide holes 181b, 181c lies on a same plane.

An opening portion 181d is formed at a periphery of the base body 181, corresponding to the concave portion 141d of the lens barrel supporting frame 141. A PSD (Position Sensitive Device) 183 is engaged with the opening portion 181d. Also, an opening portion 181e is formed at a periphery of the base body 181, corresponding to the concave portion 141e of the lens barrel supporting frame 141. A PSD 184 is engaged with the opening portion 181e. Namely, the PSD 183 is positioned corresponding to the LED 153, and the PSD 184 is positioned corresponding to the LED 154.

A yoke 190 is provided with arms 190a and 190b. The longitudinal axis of the arm 190a is parallel to the lengthwise axis, and the longitudinal axis of the arm 190b is parallel to the lateral axis. The yoke 190 is generally L-shaped. The yoke 190 is fixed on the base body 181 by screws 191, 192 and 193, in such a manner that: the screw 191 is pierced through a screw hole 190f formed in the yoke 190, and engaged with a hole 181f of the based body 181; the screw 192 is pierced through a screw hole 190g formed in the yoke 190, and engaged with a hole 181g of the base body 181; and the screw 193 is pierced through a screw hole 190h formed in the yoke 190, and engaged with a hole 181h of the base body 181.

Further, holes 195, 196, 197 and 198 are formed in the yoke 190. When the yoke 190 is fixed to the base body 181, convex portions 185, 186, 187 and 188, which are formed on a plane surface of the base body 181, respectively pierce through the holes 195, 196, 197 and 198. The height of the convex portions 185, 186, 187 and 188 is greater than the thickness of the yoke 190 so that the tip ends of the convex portions 185, 186, 187 and 188 respectively project from the holes 195, 196, 197 and 198 to the side of the guide bar 161.

A pair of magnets 201 and 202 which are parallelepiped, is positioned parallel to the lengthwise axis, on a plane surface of the arm 190a, which is on the side of the guide bar 161. The magnets 201 and 202 hold the tip end of the convex portion 187 projecting from the hole 197 and the tip end of the convex portion 188 projecting from the hole 198 therebetween, in order not to be attached to each other. A pair of magnets 203 and 204 which are parallelepiped, is positioned parallel to the lateral axis, on a plane surface of the arm 190b, which is on the side of the guide bar 161. The magnets 203 and 204 hold the tip end of the convex portion 185 projecting from the hole 195 and the tip end of the convex portion 186 projecting from the hole 196 therebetween, in order not to be attached to each other.

Figure 6:
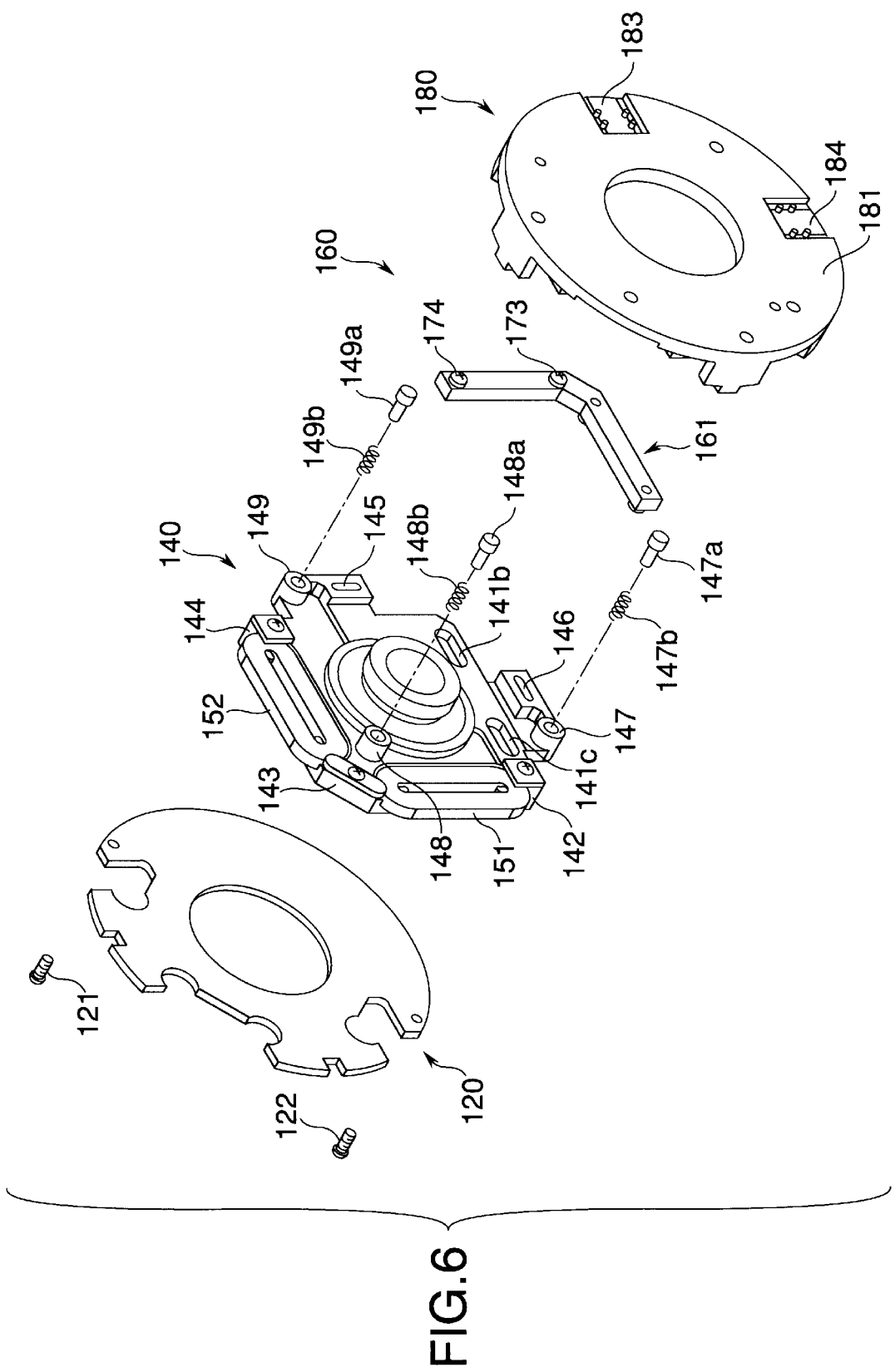
FIG. 6 is a partially exploded perspective view of the correction apparatus shown from the side of the second fixing member.
Figure 7:
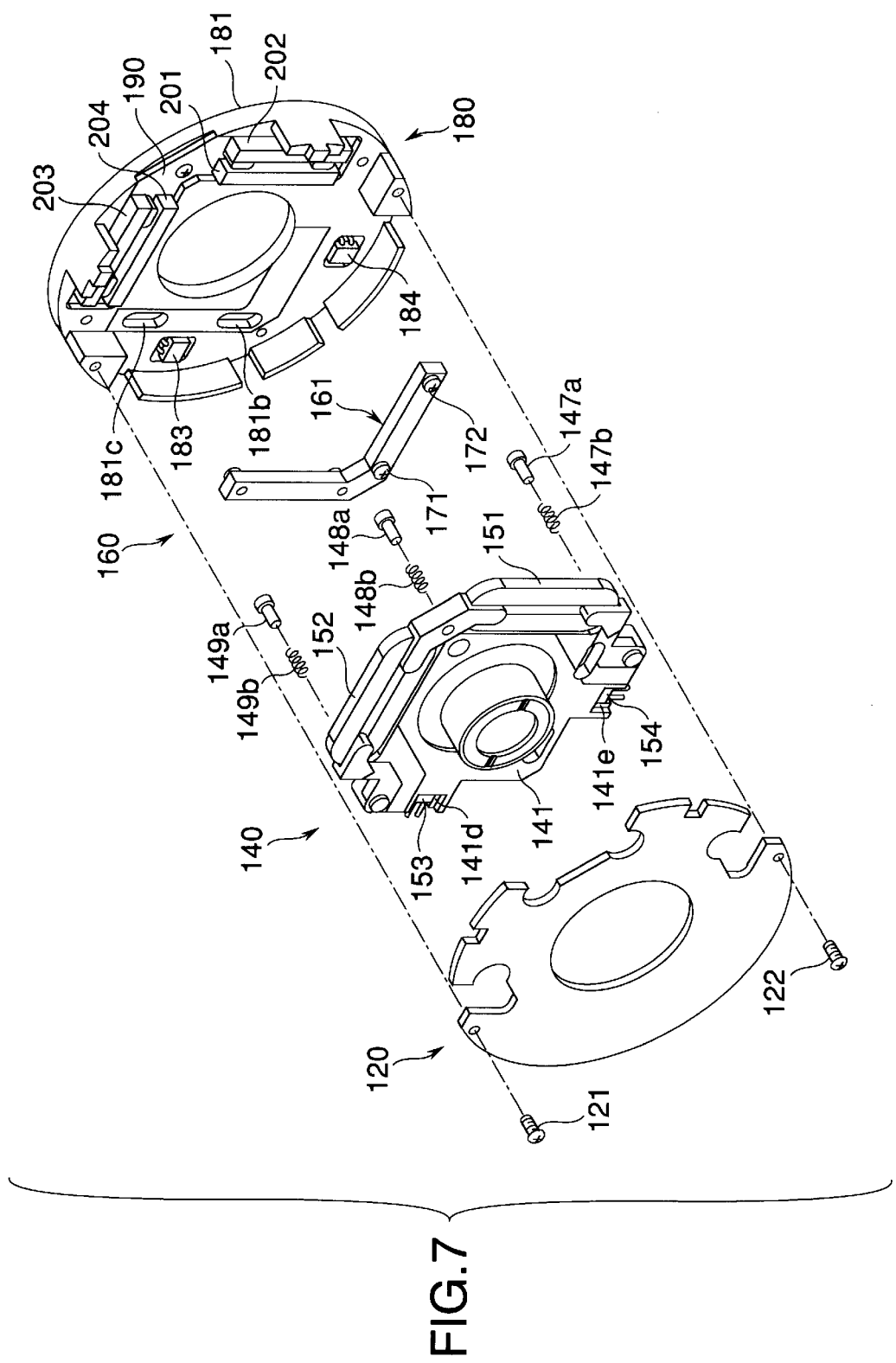
FIG. 7 is a partially exploded perspective view of the correction apparatus shown from the side of a first fixing member.

FIGS. 6 and 7 are exploded perspective views of the correction apparatus, in which the correction lens barrel 103 is fixed on the lens barrel supporting frame 141, and each element of the movable member 140 and the second fixing member 180 is assembled. FIG. 6 shows the correction apparatus from the side of the second fixing member 180, and FIG. 7 shows the correction apparatus from the side of the first fixing member 120. The guide bar 161 is held between the movable member 140 and the second fixing member 180, in such a manner that the rollers 171, 172 are respectively positioned in the lateral-axis guide holes 141b, 141c, and the rollers 173, 174 are respectively positioned in the lengthwise-axis guide holes 181b, 181c.

A slit 145, which is parallel to the lengthwise axis, is formed on the plane surface of the lens barrel supporting frame 141, which is on the side of the second fixing member 180, being positioned at a portion corresponding to the concave portion 141d. As described above, the LED 153 is positioned in the concave portion 141d, and the PSD 183 is positioned in the second fixing member 180, corresponding to the LED 153. Accordingly, a luminance flux emitted from the LED 153 reaches the PSD 183, after passing through the slit 145.

Also, a slit 146, which is parallel to the lateral axis, is formed on the plane surface of the lens barrel supporting frame 141, which is on the side of the second fixing member 180, being positioned at a portion corresponding to the concave portion 141e. As described above, the LED 154 is positioned in the concave portion 141e, and the PSD 184 is positioned in the second fixing member 180, corresponding to the LED 154. Accordingly, a luminance flux emitted from the LED 154 reaches the PSD 184, after passing through the slit 146.

Receiving holes 147, 148, 149, which are cylindrical-shaped, are formed on the plane surface which is on the side of the second fixing member 180. The receiving hole 147 is positioned close to the coil fixing frame 142, the receiving hole 148 is positioned close to the coil fixing frame 143, and the receiving hole 149 is positioned close to the coil fixing frame 144. Coil springs 147b, 148b and 149b are respectively mounted in the receiving holes 147, 148 and 149. An urging pin 147a is inserted in the receiving hole 147 such that the coil spring 147b is wound around a shaft of the urging pin 147a. An urging pin 148a is inserted in the receiving hole 148 such that the coil spring 148b is wound around a shaft of the urging pin 148a. An urging pin 149a is inserted in the receiving hole 149 such that the coil spring 149b is wound around a shaft of the urging pin 149a.

When the first fixing member 120 is fixed to the second fixing member 180 by the screws 121 and 122, heads of the urging pins 147a, 148a and 149a are respectively abutted against the base body 181 of the second fixing member 180, and the lens barrel supporting frame 141 is urged at all times in a direction toward the first fixing member 120 from the second fixing member 180, by spring force of the spring coils 147b, 148b and 149b. Accordingly, in the correcting control of the focused image tremble, movement along an optical axis of the correction lens 101 and rotational movement around an axis perpendicular to the optical axis, and so on, are restrained, so that defocus of an image imaged on a film surface is prevented and clarity of the image is achieved.

Further, when the first fixing member 120 is fixed to the second fixing member 180 by the screws 121 and 122, the movable member 140 has a clearance, from a standard position, of approximately ±1 mm (millimeter) in both the lengthwise axis and the lateral axis. Within the clearance, the movable member 140 is movable. Note that, in the standard position, the optical axis of the correction lens 101 is coaxial with an optical axis of the other optical systems included in the photographing optical system 21. When the correction apparatus is not driven, the correction lens 101 is moved due to the gravity in accordance with a holding manner of the camera 1, within a range of the clearance. However, a photographed image is not damaged by such movement of the correction lens 101.

Figure 8:
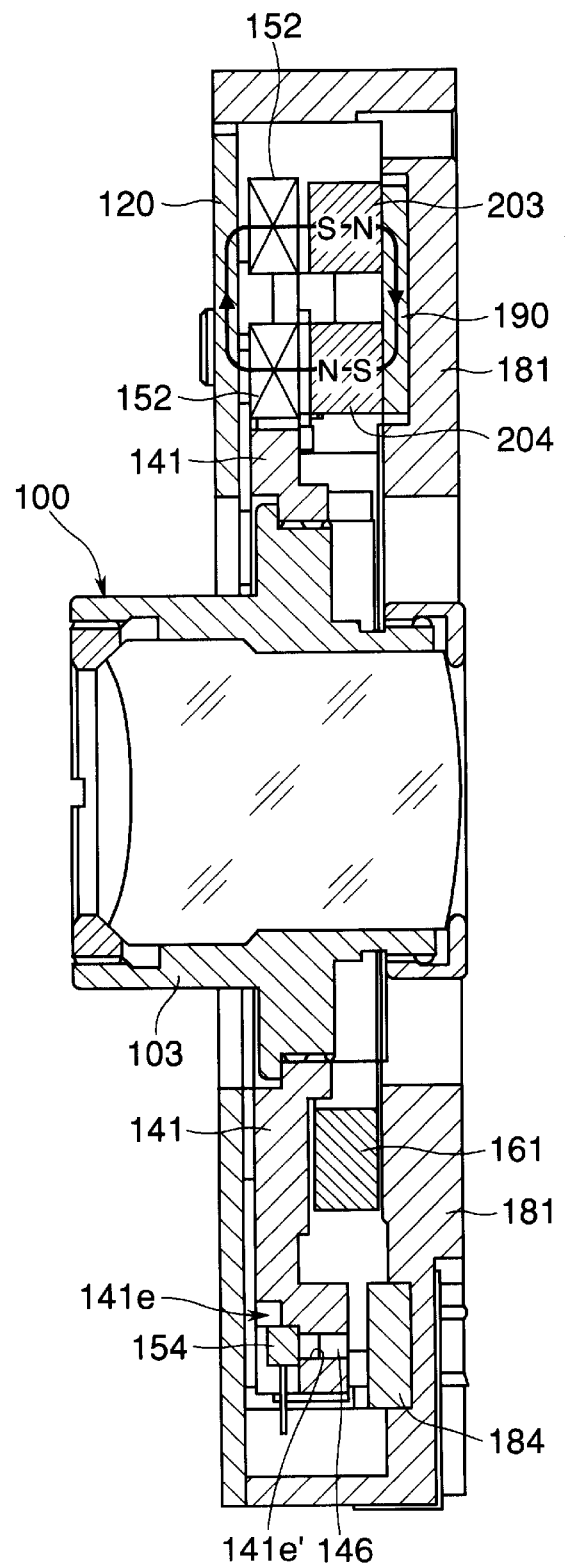
FIG. 8 is a sectional view of the correction apparatus.

FIG. 8 is a sectional view of the correction apparatus, cut by a plane, parallel to the lengthwise axis, on which the optical axis of the correction lens 101 lies.

A side of the magnet 203, which faces to the lengthwise-axis driving coil 152, is the South pole, and a side of the magnet 203, which contacts with the yoke 190 is the North pole. A side of the magnet 204, which faces to the lengthwise-axis driving coil 152, is the North pole, and a side of the magnet 204, which contacts with the yoke 190 is the South pole. A magnetic field is produced among the first fixing member 120, the magnets 203, 204, and the yoke 190, as indicated by an arrow. When a current flows through the lengthwise-axis driving coil 152, an induced electromagnetic force acts on the driving coil 152 in the lengthwise axis. As the lens barrel supporting frame 141, on which the driving coil 152 is mounted, is movable, the driving of the lens barrel supporting frame 141 in the lengthwise axis is controlled by adjusting a direction and a magnitude of the current flowing through the driving coil 152.

Note that, similar to the magnets 203 and 204, a side of the magnet 201, which faces to the lateral-axis driving coil 151, is the South pole, and a side of the magnet 201, which contacts with the yoke 190 is the North pole, also a side of the magnet 202, which faces to the lateral-axis driving coil 151, is the North pole, and a side of the magnet 202, which contacts with the yoke 190 is the South pole (see FIG. 7). Accordingly, a magnetic field is produced among the first fixing member 120, the magnets 201, 202, and the yoke 190. When a current flows through the lateral-axis driving coil 151, an induced electromagnetic force acts on the driving coil 151 in the lateral axis. Namely, the driving of the lens barrel supporting frame 141 in the lateral axis is controlled by adjusting a direction and a magnitude of the current flowing through the driving coil 151.

As described above, the rollers 171, 172 (see FIG. 7) of the guide bar 161 are respectively positioned in the lateral-axis guide holes 141b, 141c (see FIG. 6), and the rollers 173, 174 (see FIG. 6) of the guide bar 161 are respectively positioned in the lengthwise-axis guide holes 181b, 181c (see FIG. 7). Accordingly, the lens barrel supporting frame 141 is driven in the lateral axis, being led by the rollers 171, 172. Also, when the frame 141 is driven in the lengthwise axis, the frame 141 is led by the rollers 173, 174 and the guide bar 161 is driven in the lengthwise axis together with the movement of the frame 141.

In the lens barrel supporting frame 141, a hole 141e' is formed in a base surface of the concave portion 141e in which the LED 154 is provided, corresponding to an emitting portion of the LED 154. The hole 141e' is positioned at an approximate center of the slit 146, seen from the side of the second fixing member 180. As described above, the luminance flux emitted from the LED 154 reaches the PSD 184 after passing through the slit 146. Accordingly, a beam diameter of the luminance flux is defined by the hole 146e'. In accordance with movement of the frame 141 in the lengthwise axis, the position on the PSD 184, at which the luminance flux which is emitted from the LED 154 reaches the PSD 184 after passing through the hole 184e', is moved, so that a current value, output from a pair of lead lines of the PSD 184, is changed. Namely, the position of the frame 141 in the lengthwise axis is detected based on the current value of the lead lines of the PSD 184.

Note that, in the lens barrel supporting frame 141, a hole (omitted in FIG. 8) is formed on a base surface of the concave portion 141d in which the LED 153 is provided, corresponding to an emitting portion of the LED 153. Similarly to the hole 141e', the hole is positioned at an approximate center of the slit 145 (see FIG. 6), seen from the side of the second fixing member 180. In the base body 181 of the second fixing member 180, the PSD 183 is positioned at the position corresponding to the LED 153 (see FIGS. 5 and 6). As a luminance flux, emitted from the LED 153, reaches the PSD 183 after passing through the slit 145, a beam diameter of the luminance flux is defined by the hole of the concave portion 141d. In accordance with movement of the frame 141 in the lateral axis, the position on the PSD 183, at which the luminance flux which is emitted from the LED 153 reaches the PSD 183 after passing through the hole, is moved, so that a current value, output from a pair of lead lines of the PSD 183, is changed. Namely, the position of the frame 141 in the lateral axis is detected based on the current value of the lead lines of the PSD 183.

Figure 9:
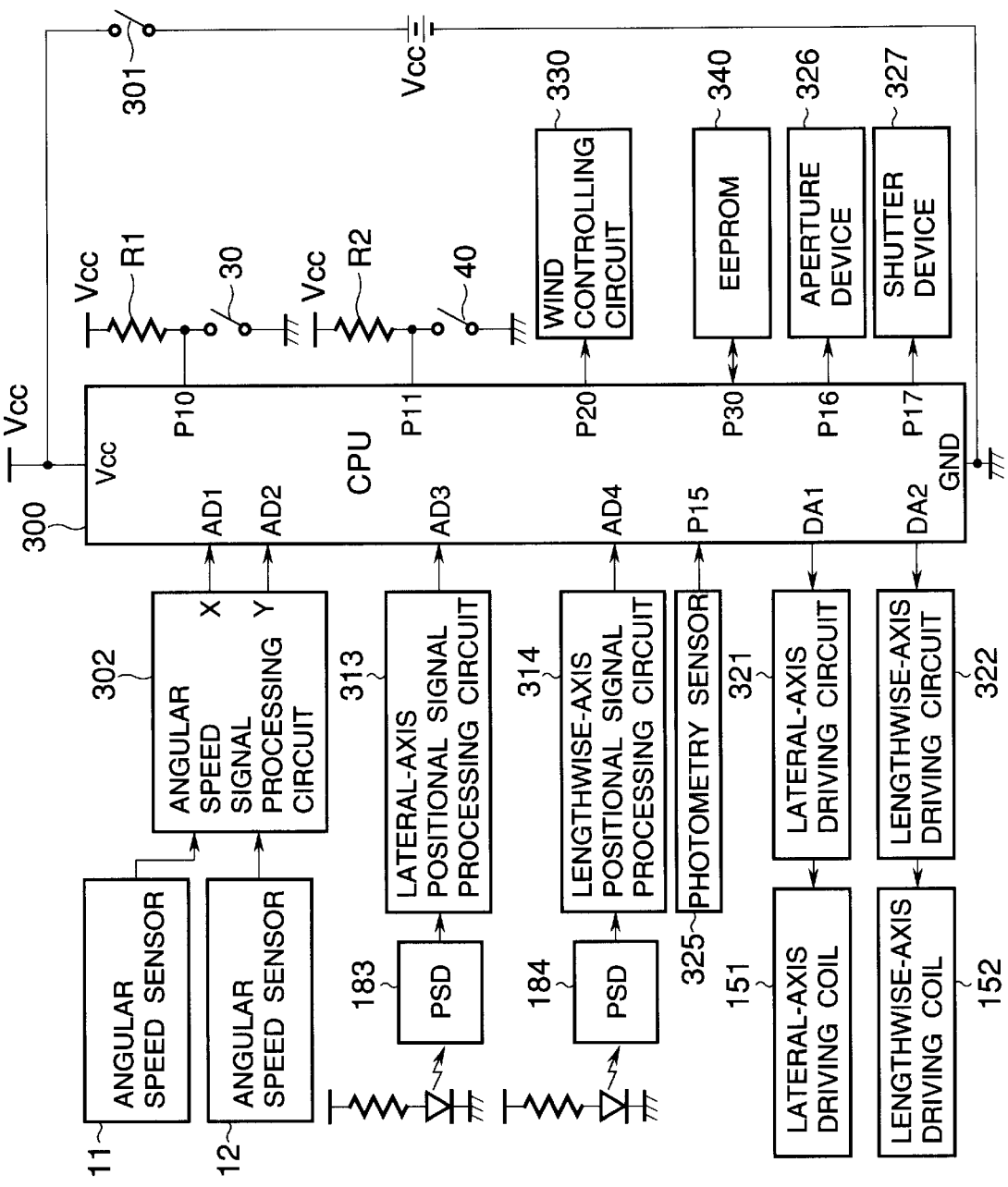
FIG. 9 is a block diagram of the camera.

FIG. 9 is a block diagram of the camera 1 to which the first embodiment is applied. A CPU 300 wholly controls the camera 1. An electric power of the CPU 300 is supplied by a direct-current power supply VCC. A start and a stop of the power supplying is operated by an ON/OFF control of a switch 301 which is mounted on a body of the camera 1. A photometry switch 30 is connected to the direct-current power supply VCC through a resistance R1, being connected to an input terminal P10 of the CPU 300. The ON/OFF status of the photometry switch 30 is confirmed by a voltage value of the input terminal P10. A release switch 40 is connected to the direct-current power supply VCC through a resistance R2, being connected to an input terminal P11 of the CPU 300. The ON/OFF status of the release switch 40 is confirmed by a voltage value of the input terminal P11.

When the shutter button 10 (see FIG. 1) is pushed by one step, the photometry switch 30 is turned to the ON position, and the photometry operation is started in the CPU 300. Output signal from a photometry sensor 325 is input through a port P15. The CPU 300 obtains a photometry value Bv from the output signal of the photometry sensor 325, and calculates an appropriate exposure value Ev based on the Bv. Further, the CPU 300 sets controlling amounts of an aperture device 326 and a shutter device 327, based on the exposure value Ev. Note that, the aperture device 326 and the shutter device 327 are fixedly supported in the body of the camera 1, being positioned closer to a film than the lens barrel 103 (see FIG. 2). As the structures of the aperture device 326 and the shutter device 327 are well-known, the detailed description is omitted.

When the shutter button 10 is pushed by two steps, the release switch 40 is turned to the ON position, and the release sequence is started. In accordance with the controlling amounts set in the photometry operation, driving signals of the aperture device 326 and the shutter device 327 are respectively output through ports P16, P17. By driving the aperture device 326 and the shutter device 327, an exposure of the film is controlled, and an object image is printed on the film.

The angular speeds, output from the angular speed sensors 11 and 12, are respectively input to an input terminal AD1 and AD2 of the CPU 300 via an angular speed signal processing circuit 302, as an angular speed x in the lateral axis and an angular speed y in the lengthwise axis.

A current value of the PSD 183 is input to an input terminal AD3 of the CPU 300 through a lateral-axis positional signal processing circuit 313, as a positional signal of the lens barrel supporting frame 141 in the lateral axis. A current value of the PSD 184 is input to an input terminal AD4 of the CPU 300 through a lengthwise-axis positional signal processing circuit 314, as a positional signal of the lens barrel supporting frame 141 in the lengthwise axis.

A tremble position table is stored in an EEPROM 340. In the tremble position table, data is stored indicating a relationship between a changing amount of angle of the optical axis OP of the photographing optical system 21, in the lateral and lengthwise axes, and tremble positional data of the optical axis OP, changed in the lateral and lengthwise axes due to the change of the angle. The tremble positional data indicates a position at which the optical axis OP pierces through a focal plane. Note that: an optical image is formed on the focal plane by the photographing optical system 21; and when the optical axis of the correction lens 101 is coaxial with the optical axis of the other optical systems included in the photographing optical system, namely, when the optical axis of the correction lens 101 coincides with the optical axis of the other optical systems, the optical axis OP is perpendicular to the focal plane, piercing through a center of the focal plane.

In the CPU 300, the lateral-axis angular speed x and the lengthwise-axis angular speed y are integrated, so that lateral-axis angular data and lengthwise-axis angular data are calculated. The CPU 300 refers to the position table based on the angular data in the lateral and lengthwise axes, so that the above-mentioned tremble positional data corresponding to each of the angular data is obtained through a port P30.

Further, the CPU 300 compares the tremble positional data obtained from the position table and the positional signals of the lens barrel supporting frame 141 in the lateral lengthwise axes, which are input to the input terminals AD3 and AD4. The CPU 300 calculates a direction and an amount of driving the frame 141 based on a result of the comparison.

Signal corresponding to the direction and the amount of driving the frame 141 in the lateral axis is output from an output terminal DA1, and input to a lateral-axis driving circuit 321. Current flows through the lateral-axis driving coil 151 in a predetermined direction by the driving circuit 321, based on the signal output from the output terminal DA1. Signal corresponding to the direction and the amount of driving the frame 141 in the lengthwise axis is output from an output terminal DA2, and input to a lengthwise-axis driving circuit 322. Current flows through the lengthwise-axis driving coil 152 in a predetermined direction by the driving circuit 322, based on the signal output from the output terminal DA2. When a focused image tremble does not occur, the CPU 300 controls the direction and the amount of the current flowing through each of the lateral-axis driving coil 151 and the lengthwise-axis driving coil 152 for driving the lens barrel supporting frame 141 so that the correction lens 101 is stopped at the standard position.

Further, a wind controlling circuit 330 is connected to the CPU 300. A winding operation of a film is carried out by the wind controlling circuit 330 based on an output signal from the CPU 300.

Figure 10:
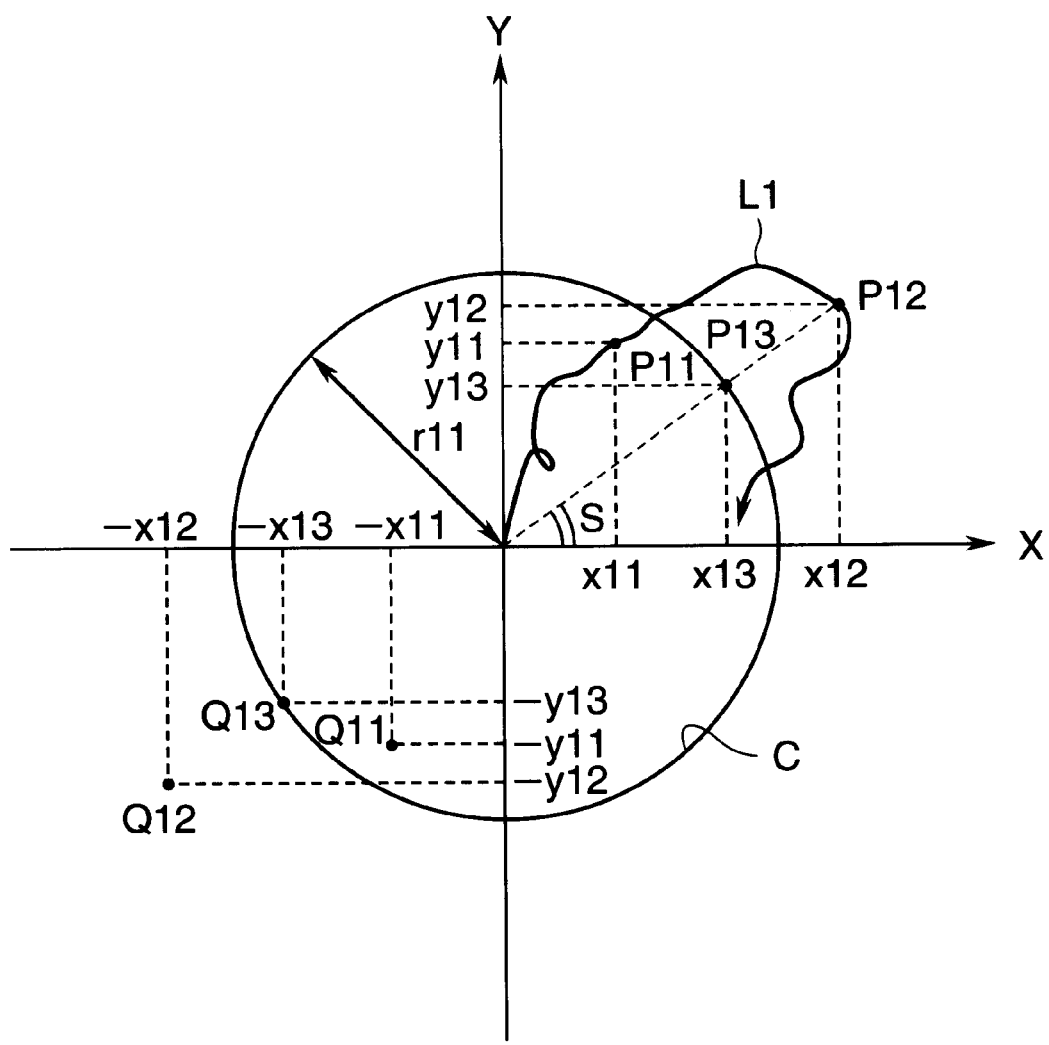
FIG. 10 is two-dimensional coordinates indicating a correctable range of a correction lens and a displacement of an optical axis of a photographing optical system.

Referring now to FIG. 10, an operation to determine whether the focused image tremble is correctable will be explained. FIG. 10 is two-dimensional coordinates indicating the focal plane on which the optical image is imaged by the photographing optical system 21. In FIG. 10, a correctable range of the correction lens 101 and a change of the tremble position of the optical axis OP are depicted. The position of the optical axis OP in the lateral and lengthwise axes, obtained by the above-mentioned tremble position table, and the position of the optical axis of the correction lens 101 are indicated by an X-coordinate and a Y-coordinate.

An intersection point of an X-axis and a Y-axis corresponds to an original position of the correction lens 101. When the correction lens 101 is at the original position, the optical axis of the correction lens 101 is coaxial with the optical axis of the other optical systems of the photographing optical system. Namely, the original position is a center of the focal plane. As described above, when a focused image tremble does not occur, the correction lens 101 is stopped at the original position by the control of the CPU 300. Further, in the first embodiment, the photographing optical system 21 is mounted in the camera 1 such that the optical axis OP pierces through a center of the opening portion 181a. Namely, when the correction lens 101 is stopped at the original position, the optical axis of the correction lens 101 pierces through the center of the opening portion 181a.

Further, in FIG. 10, a circle C indicates a correctable range of the correction lens 101, and a line L1 indicates an example of the focused image tremble (a change of the position of the optical axis OP on the focal plane).

As described above, in the first embodiment, the small diameter portion 103a (see FIG. 2) of the correction lens barrel 103 pierces through the opening portion 181a (see FIG. 5) of the base body 181 of the second fixing member 180. A position, at which the outer surface of the small diameter portion 103a is in contact with the inner surface of the opening portion 181a, is a boundary position of the driving range of the correction lens barrel 103. In accordance with the boundary position, a boundary range, of driving the lens barrel supporting frame 141 in which the correction lens barrel 103 is fixed and the correction lens 101 being fixed in the correction lens barrel 103, is defined due to the structure of the correction apparatus. In the first embodiment, the correctable range of the correction lens 101 is controlled by the CPU to be smaller than the boundary range of driving. Optionally, the CPU 300 controls the driving of the lens barrel supporting frame 141 such that the radius of the circle C is smaller than the radius of a circular boundary range defined by a position at which the small diameter portion 103a is in contact with the opening portion 181a, by approximately 3 percent.

As described above, the change amount of the angle of the optical OP due to the tremble of the camera 1 is converted to a positional change on the focal plane of FIG. 10, by the operation of the CPU 300 using the above-mentioned tremble position table. The correction of the focused image tremble is implemented by controlling the driving of the correction lens 101 such that the positional change of the optical axis OP due to the tremble of the camera 1 is canceled. When the positional change of the optical axis OP is within the circle C, the focused image tremble is correctable, because it is possible to drive the correction lens 101 such that the positional change of the optical axis OP is canceled. When the positional change of the optical axis OP is out of the circle C, the focused image tremble is not correctable, because the correction lens 101 is unable to be driven out of the circle C and the positional change of the optical axis OP is not canceled.

For example, if the optical axis OP is moved to a point P11 (x11, y11), the correction lens 101 is driven so that the optical axis of the correction lens 101 is moved to a point Q11 (−x11, −y11), in which each sign of an x-component and a y-component of the point P11 is reversed. On the other hand, if the optical axis OP is moved out of the circle C, for example, if the optical axis OP is moved to a point P12 (x12, y12), the correction lens 101 should be driven for the correction of the focused image tremble, such that the optical axis of the correction lens 101 is moved to a point Q12 (−x12, −y12), in which each sign of an x-component and a y-component of the point P12 is reversed. However, the Q12 is out of the circle C, namely being out of the correctable range of the correction lens 101.

In the first embodiment, a length of a straight line connecting the changed position of the optical axis OP and the center of the focal plane is calculated based on the x-coordinate and the y-coordinate of the changed position of the optical axis OP. By comparing the length with the radius r11 of the circle C, it is judged whether the correction of the focused image tremble is possible. If the focused image tremble is out of the correctable range, the optical axis OP is supposed to be moved to an intersection of the circle C and the straight line connecting the changed position of the optical axis OP and the center of the focal plane. In other words, if the focused image tremble is out of the correctable range, the optical axis OP is supposed to be moved to a point on the arc of the circle C which is closest to the optical axis OP. Then, the correction lens 101 is driven such that the optical axis of the correction lens 101 is moved to a point in which each sign of the x-component and the y-component of the supposed point is reversed.

For example, if the optical axis OP is positioned at the point P12, a point P13 (x13, y13), which is an intersection of the circle C and a line connecting the original point and the P12, is calculated. Then, a point Q13 (−x13, −y13), in which each sign of the x-component and the y-component is reversed, is calculated, and the correction lens 101 is driven such that the optical axis of the correction lens 101 is moved to the Q13.

Figure 11:
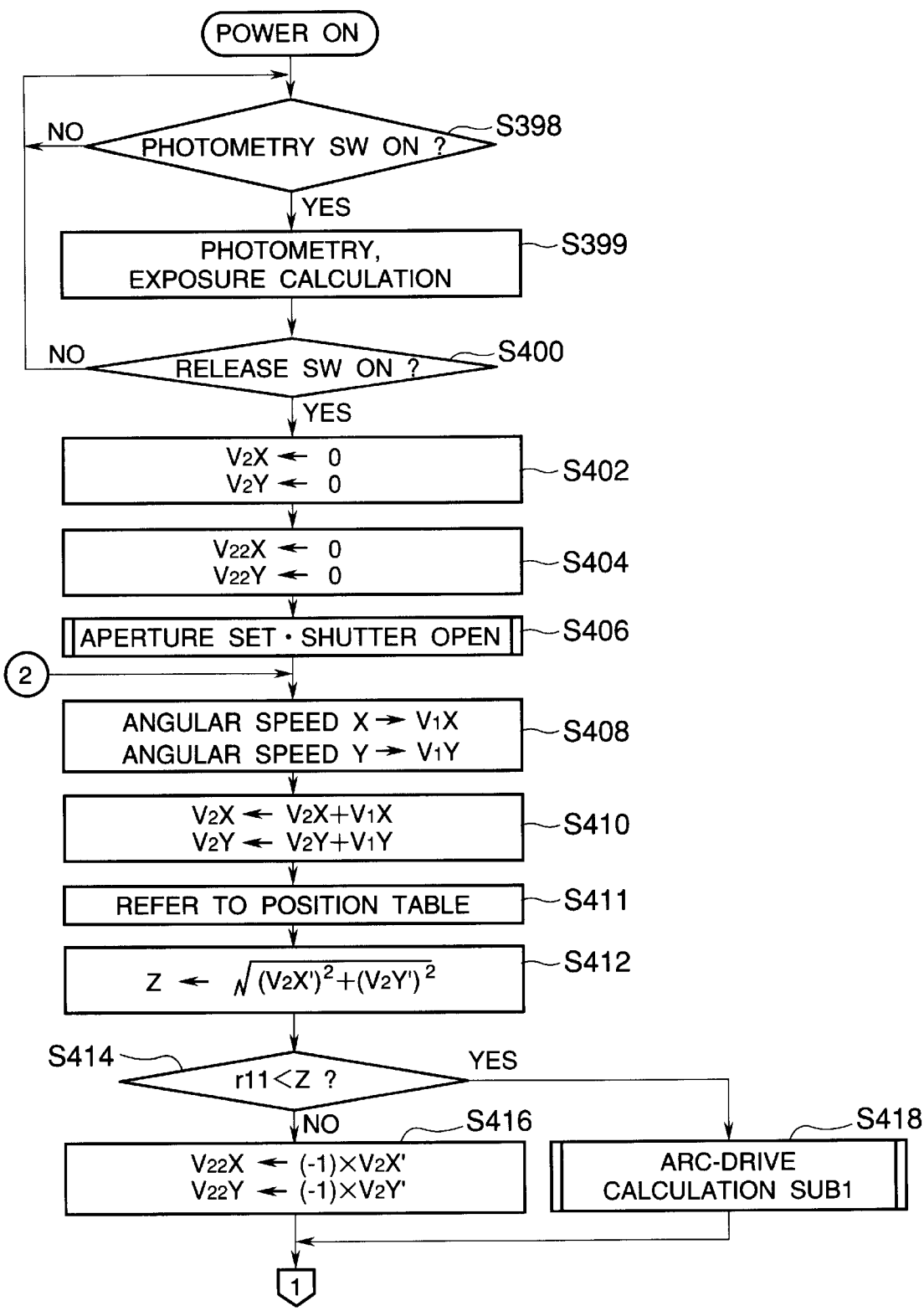
FIG. 11 is a first half of a flowchart indicating procedures of a main operation of photographing in the camera.
Figure 12:
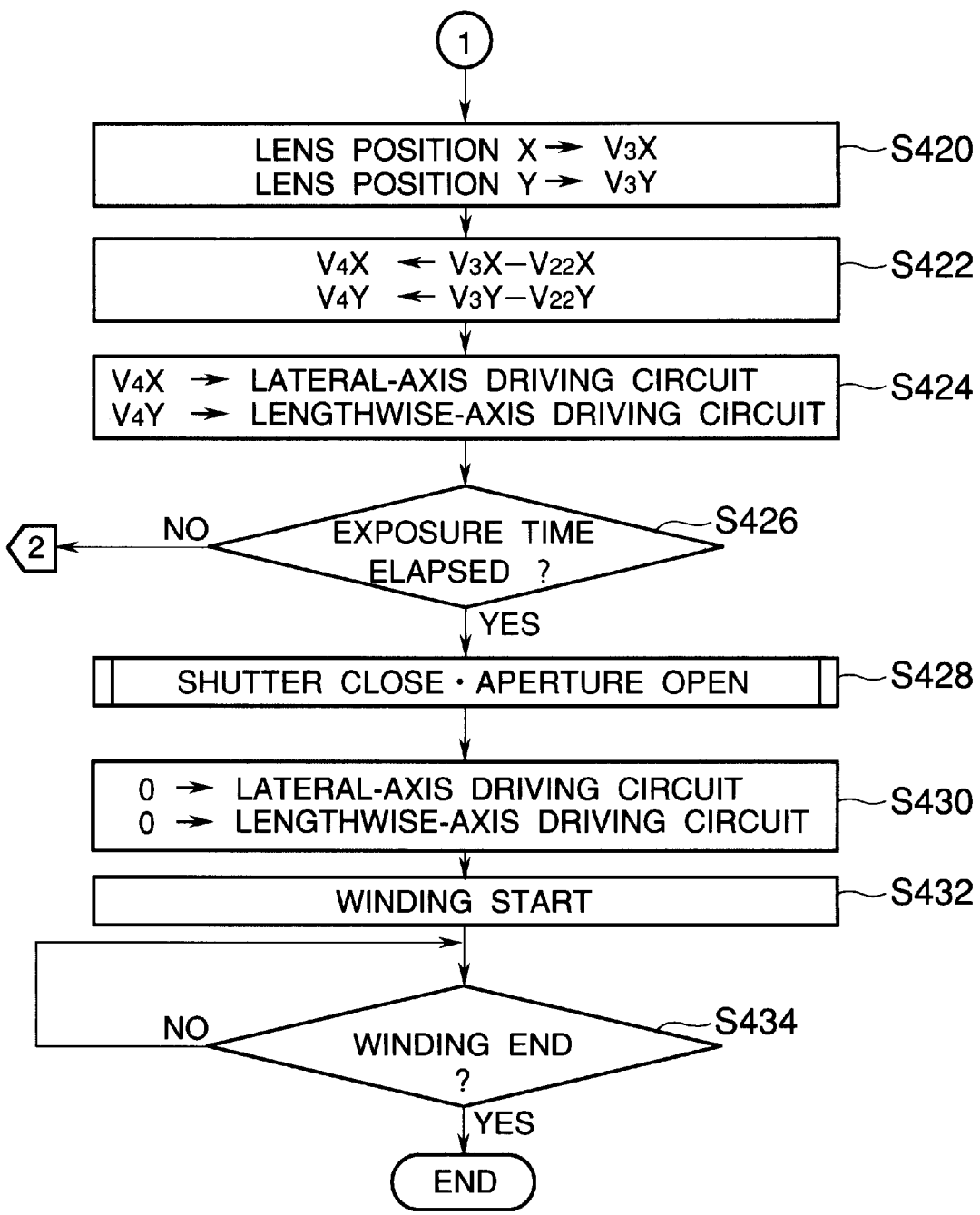
FIG. 12 is a latter half of the flowchart indicating procedures of a main operation of photographing in the camera.

FIGS. 11 and 12 indicate a flowchart of a main operation of photographing in the camera 1 to which the first embodiment is applied.

When a power switch of the camera 1 is pushed to be turned to the ON position, at step S398, a status of the photometry switch 30 is checked. If the photometry switch 30 is ON, the process continues to step S399. At step S399, an exposure value (Ev) is calculated in the CPU 300 by performing a photometry operation of a luminance reflected by the object through a photometry device, when the ON signal is input to the first input port P10. Then, an aperture value (Av) and an exposure time (Tv) are calculated based on the Ev, in the CPU 300.

Then, at step S400, a status of the release switch 40 is checked. If the release switch 40 is not ON, the process returns to step S398. If the release switch 40 is ON, the process continues to step S402. At step S402, variables $V_2X$ and $V_2Y$ are respectively set to "0" to be initialized. A tremble angle of the camera 1 in the lateral axis is stored in the variable $V_2X$, and a tremble angle of the camera 1 in the lengthwise axis is stored in the variable $V_2Y$. At step S404, variables $V_{22}X$, $V_{22}Y$ are respectively set to "0" to be initialized. The variables $V_{22}X$, $V_{22}Y$ are used for calculating the driving amount of the correction lens 101.

At step S406, a usual release sequence is carried out. Namely, an opening degree of an aperture is adjusted, a quick-return mirror is set to an up position, and a shutter device is opened, and so on.

Subsequently, at step S408, an angular speed x of the optical axis OP in the rotational direction α, output from the angular speed sensor 11, is input to the input terminal AD1 to be converted to a digital value. Similarly, an angular speed y of the optical axis OP in the rotational direction β, output from the angular speed sensor 12, is input to the input terminal AD2 to be converted to a digital value. The digital values of the angular speed x and the angular speed y are respectively stored in variables $V_1X$, $V_1Y$ in which data of the angular speed is stored. At step S410, the values of the variables $V_2X$ and $V_2Y$ are set by adding the values of the variables $V_1X$, $V_1Y$ to the stored values of the variables $V_2X$ and $V_2Y$. Namely, angular data, obtained by integrating the angular speed, is stored in the variables $V_2X$ and $V_2Y$.

At step S411, the tremble position table stored in the EEPROM is referred to based on the variables $V_2X$ and $V_2Y$, so that the positional data of the optical axis OP on the focal plane, corresponding to each of the angular data in the lateral and lengthwise axes, is obtained. The positional data with respect to the lateral and lengthwise axes is respectively stored in variables $V_2X'$ and $V_2Y'$.

At step S412, a length between the original point on the focal plane (the center of the focal plane) and the position of the optical axis OP on the focal plane is calculated based on the values of the variables $V_2X'$ and $V_2Y'$. The length is stored in a variable Z. Subsequently, at step S414, it is checked whether the value of the variable Z is smaller than the radius r11 of the circle C of FIG. 10. When the value of the variable Z is not greater than the radius r11, it indicates that the change of the optical axis OP is within the correctable range of the correction lens 101. When the value of the variable Z is greater than the radius r11, it indicates that the change of the optical axis OP is out of the correctable range of the correction lens 101.

If it is confirmed at step S414 that the value of the variable Z is not greater than the radius r11, the process continues at step S416. At step S416, values, in which each sign of the values of the variables $V_2X'$ and $V_2Y'$ are respectively reversed, are copied to the variables $V_{22}X$ and $V_{22}Y$. The variables $V_{22}X$ and $V_{22}Y$ respectively represent driven positions of the correction lens 101 along the x-axis and the y-axis. If it is confirmed at step S414 that the variable Z is greater than the radius r11, the process goes to step S418, then an arc-drive-calculation subroutine 1 is carried out.

For example, when the optical axis OP is moved to the point P11 of FIG. 10, the process goes to step S416, and the x-coordinate and y-coordinate of the point Q11, in which each sign of the x-coordinate and y-coordinate of the point P11 is reversed, are respectively stored to the variables $V_{22}X$ and $V_{22}Y$. When the optical axis OP is moved to the point P12, the arc-drive-calculation subroutine 1 is carried out.

Figure 13:
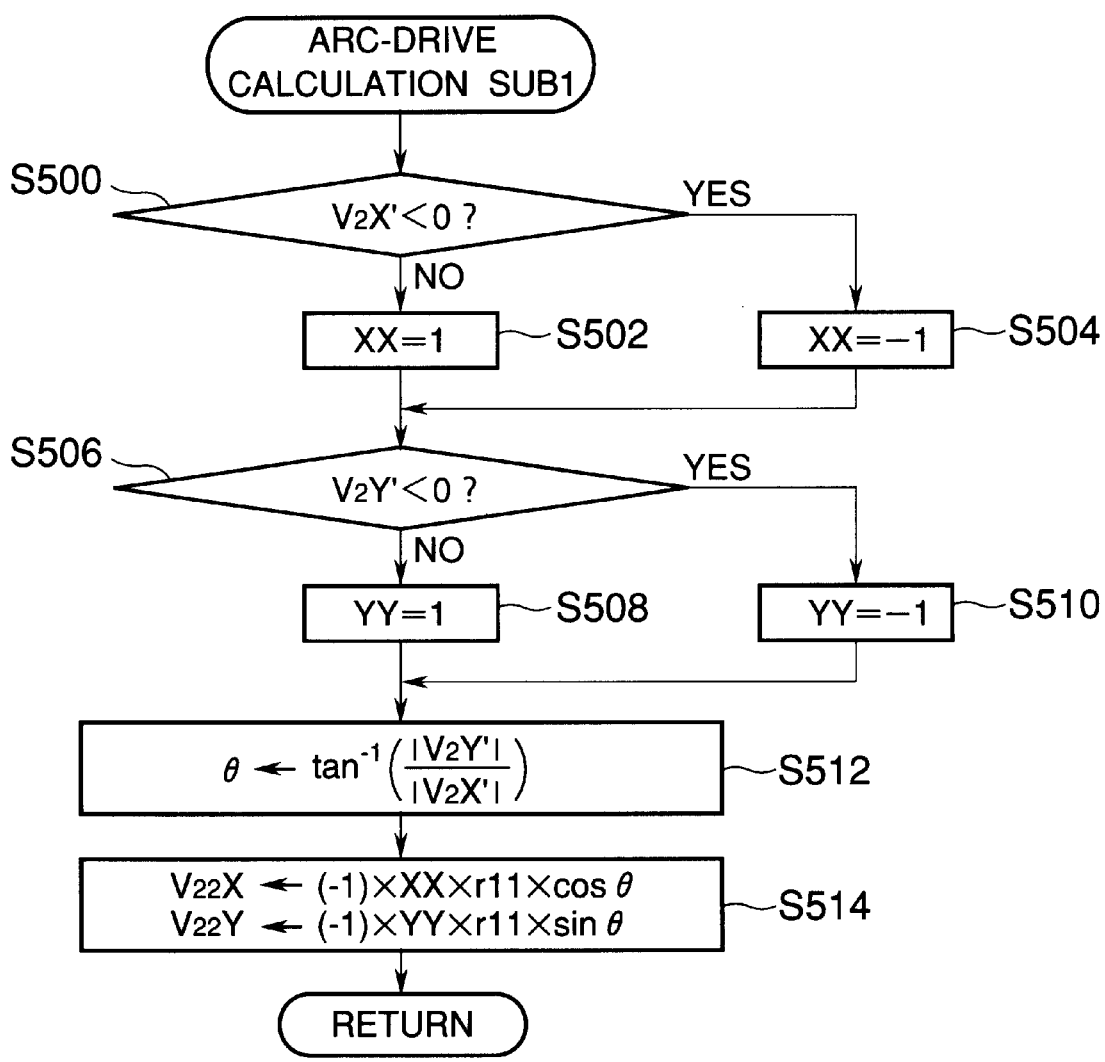
FIG. 13 is a flowchart of the procedures of an arc-drive calculation subroutine 1.

FIG. 13 indicates a flowchart of processing steps of the arc-drive-calculation subroutine 1 invoked at step S418 of FIG. 11. At step S500, it is checked whether the variable $V_2X'$ is positive or negative. Then, at step S502 or step S504, a flag XX is set in accordance with a result of the operation of step S500. Namely, if the variable $V_2X'$ is positive, the flag XX is set to "1", and if the variable $V_2X'$ is negative, the flag XX is set to "−1". Similarly, at step S506, it is checked whether the variable $V_2Y'$ is positive or negative. If the variable $V_2Y'$ is positive, a flag YY is set to "1" at step S508, and if the variable $V_2Y'$ is negative, the flag YY is set to "−1" at step S510.

Namely, in the operations from step S500 through step S510, information with respect to the negativity and positivity of the variables $V_2X'$ and $V_2Y'$ is saved in the flags XX and YY. For example, when the optical axis OP is moved to the point P12 of FIG. 10, the flags XX and YY are respectively set to "1".

Subsequently, by the procedures of steps S512 and S514, an intersection, of the boundary of the correctable range (the arc of the circle C of FIG. 10) and the straight line connecting the original point (the center of the focal plane) and the optical axis OP which is out of the correctable range, is calculated. At step S512, an angle is calculated, a tangent of which meets the ratio of the absolute value of the variable $V_2Y'$ to the absolute value of the variable $V_2X'$. The value of the angle is stored in a variable θ. When the optical axis OP is moved to the point P12 of FIG. 10, x12 is stored in the variable $V_2X'$ and y12 is stored in the variable $V_2Y'$. An angle S, defined by the X-axis and a line connecting the original point and the point P12, is calculated based on the absolute values of x12 and y12. The value of the angle S is stored in the variable θ.

At step S514, the x-coordinate and y-coordinate, of the intersection of the correctable range circle and the line connecting the position of the optical axis OP on the focal plane and the original point, is calculated, using the values of the variable θ calculated at step S512, the flags XX and YY, and the radius r11. A value, of the x-coordinate calculated at step S514 in which the sign is reversed, is stored in the variable $V_{22}X$, and a value, of the y-coordinate calculated at step S514 in which the sign is reversed, is stored in the variable $V_{22}Y$.

With reference to FIG. 10, when the optical axis OP is moved to the point P12, the x-coordinate and y-coordinate of the point P13, which is the intersection of the circle C and the line connecting the point P12 and the original point, are calculated. Then, a value "-x13" of the x-coordinate of the point Q13, in which the sign of the x-coordinate of the P12 is reversed, is stored in the $V_{22}X$, and a value "-y13", of the y-coordinate of the point Q13, in which the sign of the y-coordinate of the P12 is reversed, is stored in the $V_{22}Y$.

After the procedures of step S512 and S514 are performed, the process returns to step S418 of FIG. 11.

As described above, in this subroutine, the signs of the variables $V_2X'$ and $V_2Y'$, representing the direction of the displacement of the optical axis OP from the original point, are extracted. Further, based on the absolute values of the variables $V_2X'$ and $V_2Y'$, a quantity of the displacement of the intersection, of the circle C and the line connecting the original point and the position of the optical axis OP on the focal plane, from the original point, is calculated. Namely, the displacement quantity is calculated, based only a quantity of the displacement of the optical axis OP from the original point. Furthermore, the data representing the direction from the original point to the position of the optical axis OP is added to the displacement quantity of the intersection. Accordingly, the two-coordinates of the intersection is calculated by the common procedures, wherever the optical axis OP exists on the focal plane, so that facility of the control of this subroutine is achieved.

After the values, representing the driving positions of the correction lens 101 along the x-axis and y-axis, are stored in the $V_{22}X$ and $V_{22}Y$ at step S416 or step S418 in accordance with the result of the procedure of step S414, the process goes to step S420 of FIG. 12.

At step S420, the positional data of the correction lens 101 in the lateral axis, output from the lateral-axis positional signal processing circuit 313, is stored in a variable $V_3X$, and the positional data of the correction lens 101 in the lengthwise axis, output from the lengthwise-axis positional signal processing circuit 314, is stored in a variable $V_3Y$. Subsequently, at step S422, a difference between the variables $V_3X$ and $V_{22}X$ is stored in a variable $V_4X$, and a difference between the variables $V_3Y$ and $V_{22}Y$ is stored in a variable $V_4Y$. Namely, a difference is calculated between the present position of the correction lens 101 and the position to which the correction lens 101 should be moved for correcting the focused image tremble.

At step S424, directions and quantities of driving the correction lens 101 along both the lateral axis and lengthwise axis are calculated based on the values of the variables $V_4X$, $V_4Y$. Signals corresponding to the directions and quantities are respectively output to the lateral-axis driving circuit 321 and the lengthwise-axis driving circuit 322.

Current flows through the lateral-axis driving coil 151 in a predetermined direction and by a predetermined magnitude, under the control of the driving circuit 321 based on the direction and the quantity of driving the correction lens 101 in the lateral axis, similarly, current flows through the lengthwise-axis driving coil 152 in a predetermined direction and by a predetermined magnitude, under the control of the driving circuit 322 based on the direction and the quantity of driving the correction lens 101 in the lengthwise axis. Consequently, the lens barrel supporting frame 141 is driven.

At step S426, it is checked whether the exposure time (Tv), calculated at step S399 of FIG. 11, is elapsed. If the exposure period still continues, the process returns to step S408, and if the exposure period is elapsed, the process goes to step S428. Namely, during the exposure period, the procedures from step S408 through step S424 are repeatedly performed, so that the correction of the focused image tremble is carried out. Accordingly, the correction lens 101 is kept moving on the arc of the circle C which is the boundary of the correctable range, if the positional change of the optical axis OP continues out of the correctable range during the exposure period.

At step S428, the shutter is closed, the quick return mirror is reset to a down position, the aperture is driven to a fully open position. At step S430, value of signals which are output to the driving circuits 321 and 322 is set to "0", so that the power supply to the lateral-axis driving coil 151 and the lengthwise-axis driving coil 152 is stopped.

Then, at step S432, the wind controlling circuit 330 is activated based on the control signal output from the output port P20 of the CPU 300, so that the winding operation of the film is started.

At step 434, it is checked whether the winding operation is finished. If it is determined that the winding operation is not finished, the winding operation continues, and if it is confirmed that the winding operation is finished, the photographing operation is ended.

Figure 14:
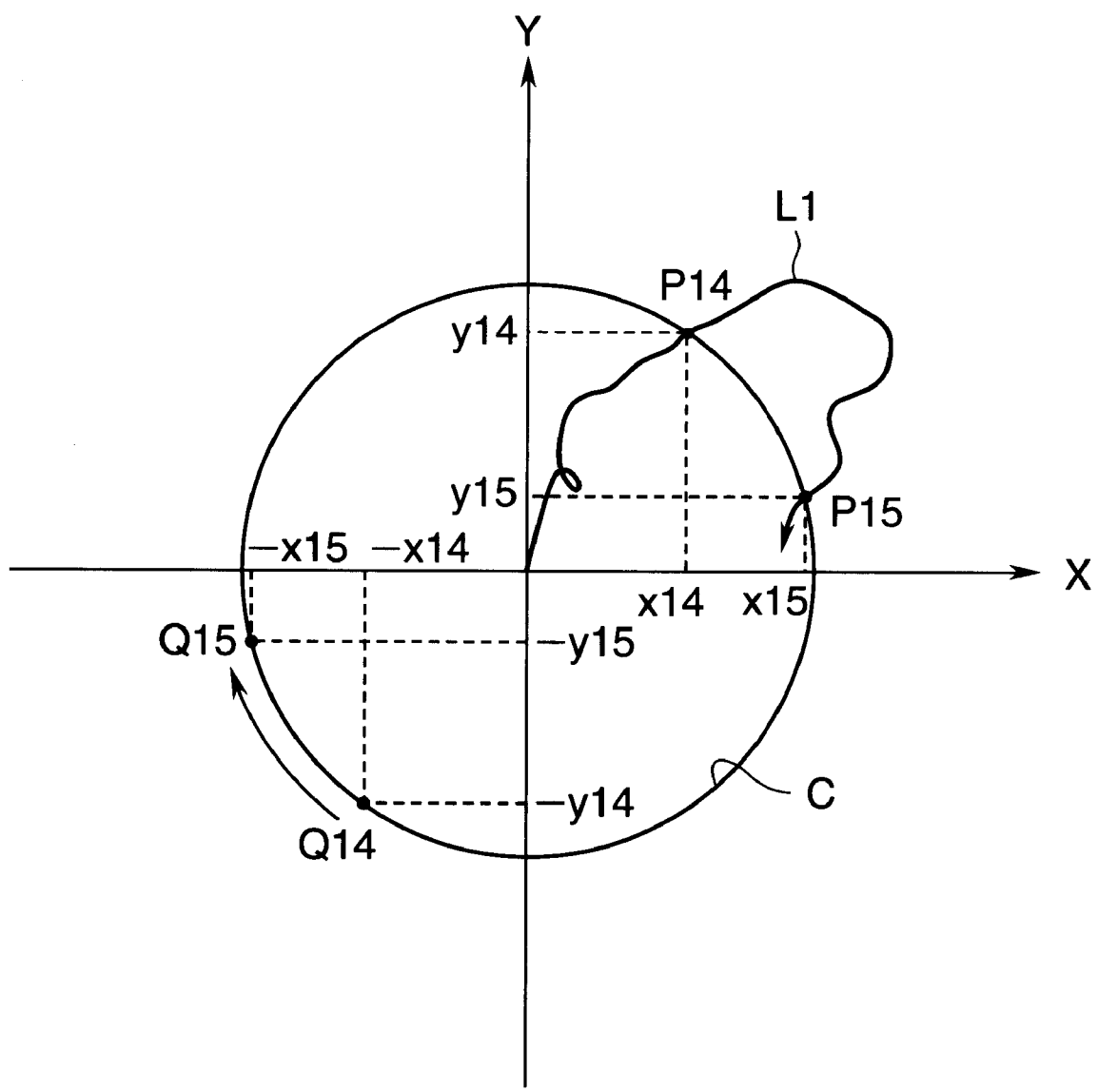
FIG. 14 is the two-dimensional coordinates in which a movement of the correction lens according to the first embodiment is indicated.

Referring now to FIG. 14, the effect of the first embodiment will be explained. FIG. 14 indicates the two-dimensional coordinates showing the above-mentioned focal plane, similarly to FIG. 10. In FIG. 14, the correctable range of the correction lens 101 and the tremble position of the optical axis OP are depicted. Elements depicted in FIG. 14, which are identical in FIG. 10, share the same characters and numerals.

While the optical axis OP is moved out of the correctable range, namely while the optical axis OP is moved on a portion of the line L1 between points P14 and P15, the correction lens 101 is driven to move on the arc of the circle C from a point Q14 to a point Q15. Accordingly, when the optical axis OP is moved within the correctable range, namely when the optical axis OP is moved to the point P15, the correction lens 101 is positioned at the point Q15 corresponding to the point P15. Therefore, when the position of the optical axis OP comes back within the correctable range and the true correction of the focused image tremble is restarted, the correction lens 101 starts following the positional change of the optical axis OP in an instant, preventing a time delay.

Further, according to the first embodiment, while the optical axis OP is moved out of the correctable range, a position on the arc of the circle C, which is closest to the optical axis OP, is supposed to be a position of the optical axis OP on the focal plane. Then, the correction lens 101 is kept moving on the arc of the circle C such that the displacement of the supposed position is canceled. Accordingly, in comparison with a control under which the correction lens 101 is stopped while the optical axis OP remains out of the correctable range, a deterioration of a photographed image due to the focused image tremble is reduced to become minimal.

Furthermore, according to the first embodiment, the correctable range of the correction lens 101 is limited to be smaller than the boundary range of driving, which is mechanically defined by the positional relationship between the small diameter 103a of the correction lens barrel 103 and the opening portion 181a of the base body 181 of the second fixing member 180. Accordingly, it is prevented that: the small diameter 103a collides the inner surface of the opening portion 181a; and an extra load is added to the other members by the movement of the small diameter 103a with the outer surface of the small diameter 103a being in contact with and moving along the inner surface of the opening portion 181a. Therefore, the correction lens 101 is smoothly moved.

With reference to FIGS. 15–19, a second embodiment according to the present invention will be explained. Note that the second embodiment is applied to the camera 1, similarly to the first embodiment.

Figure 15:
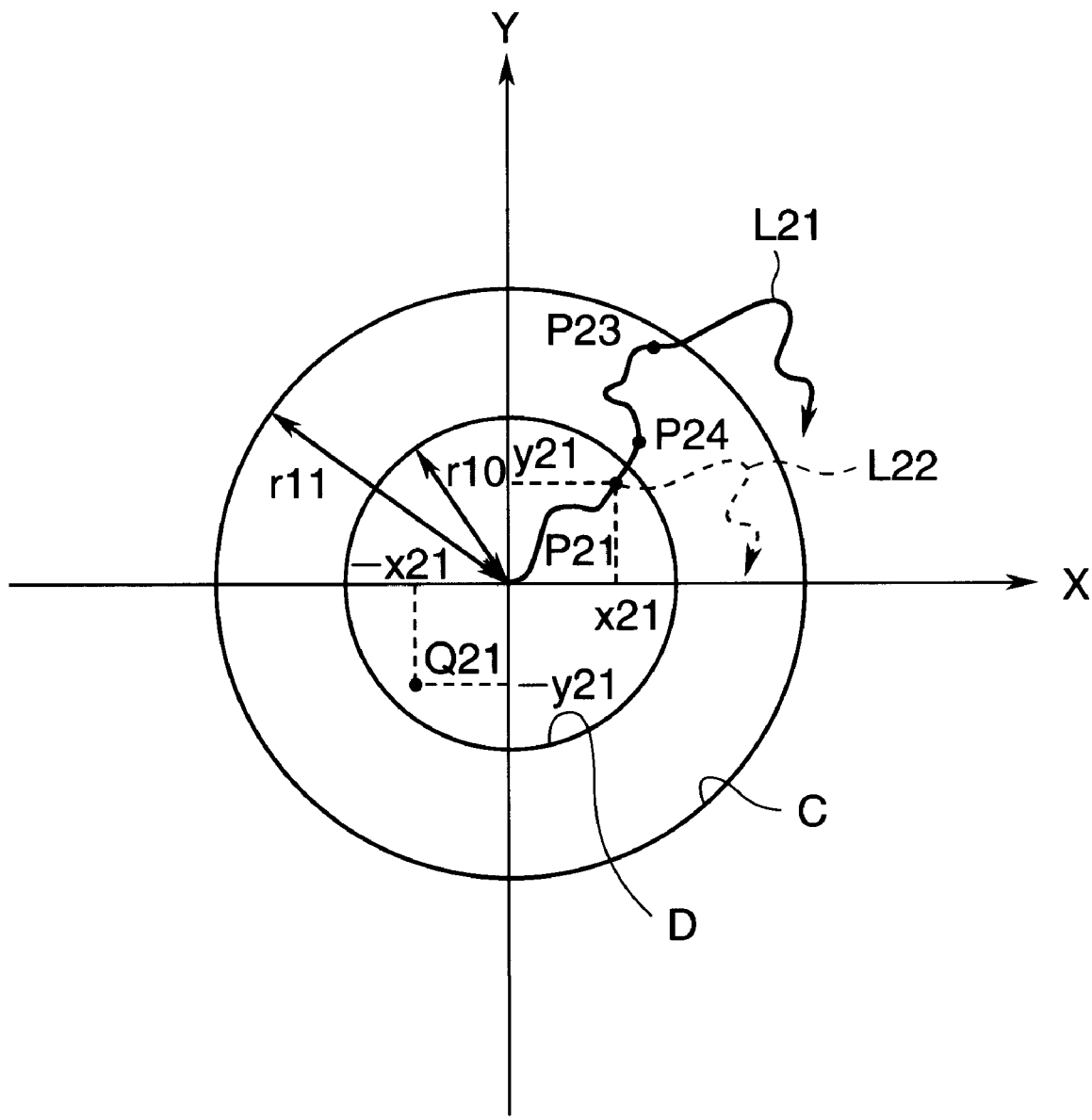
FIG. 15 is two-dimensional coordinates in which a movement of the correction lens according to a second embodiment is indicated.

FIG. 15 indicates the two-dimensional coordinates showing the above-mentioned focal plane, similarly to FIG. 10 of the first embodiment. Elements depicted in FIG. 15, which are identical in FIG. 10, share the same characters and numerals. As described above, the radius r11 of the circle C is smaller than the radius of the circular boundary range defined by the position at which the small diameter portion 103a is in contact with the opening portion 181a, by approximately 3 percent.

In FIG. 15, the circle C indicates the correctable range (a second focused image tremble range) of the correction lens 101 during a period in which the aperture device 326 and the shutter device 327 are driven and the film is exposed (in other words, an image capturing state), namely while a shuttering operation is performed. A circle D indicates another corresponding range (a first focused image tremble range) of the correction lens 101 during a period in which the driving of the aperture device 326 and the shutter device 327 is stopped and the film is not exposed (in other words, a standby state), namely while the shuttering operation is not performed.

During the exposure period (i.e. the photographing state), the CPU 300 controls the driving of the lens barrel supporting frame 141, such that the correction lens 101 is moved within the circle C. Further, during the period in which the film is not exposed, the CPU 300 controls the driving of the lens barrel supporting frame 141, such that the radius r10 of the circle D is half of the radius r11 of the circle C.

Further, similarly to the first embodiment, the tremble position table is used. Namely, the change amount of the angle of the optical OP due to the tremble of the camera 1 is converted to a positional change on the focal plane of FIG. 15, by the operation of the CPU 300 using the tremble position table. The correction of the focused image tremble is implemented by controlling the driving of the correction lens 101 such that the position change of the optical axis OP due to the tremble of the camera 1 is canceled. During the exposure period, if the positional change of the optical axis OP is within the circle C, the focused image tremble is correctable, because it is possible to drive the correction lens 101 such that the positional change of the optical axis OP is canceled. During the exposure period, if the positional change of the optical axis OP is out of the circle C, the focused image tremble is not correctable, because the correction lens 101 is unable to be driven out of the circle C and the positional change of the optical axis OP is not canceled.

During the period in which the film is not exposed (i.e. the standby state), if a focused image tremble occurs out of the circle D, the driving of the correction lens 101 is stopped by the CPU 300. If the optical axis OP is moved from a point P21 to a point P24 due to, for example, a hand tremble, the correction lens 101 is stopped at a position in which the optical axis of the correction lens 101 is stopped at a point Q21. The correction lens 101 was driven such that the optical axis of the correction lens 101 was moved to the point Q21, in order to cancel the change of the optical axis OP to the point P21. After that, the correction lens 101 is kept stopped at the position, till the optical axis OP returns within the circle D.

When the release sequence is started and the exposure begins, the correction lens 101 is restarted to be driven from a position at which the correction lens 101 was stopped before the release sequence started. For example, if the exposure begins when the optical axis OP is moved to a point P23, in a situation in which the correction lens 101 was stopped at a position such that the optical axis of the correction lens 101 was stopped at the point Q21, the correction lens 101 is driven from the latter position, in order to cancel the movement of the optical axis OP from the point P23. Namely, after the release sequence is started, the actual focused image tremble is moved from the point P23 as shown by a solid line L21, however, according to the second embodiment, the focused image tremble is supposed to be moved from the point P21 as shown by a broken line L22. Accordingly, the correction lens 101 is driven such that the supposed movement of the optical axis OP as shown by the broken line L22 is canceled.

In the second embodiment, the length between the optical axis OP and the original point is calculated based on the x-coordinate and y-coordinate of the optical axis OP, similarly to the first embodiment. During the period in which the film is not exposed, the length is compared with the radius r10, and during the exposure period, the length is compared with the radius r11, so that it is judged whether the focused image tremble is correctable during each period.

FIGS. 16–19 indicate a flowchart of main processing steps of photographing in the camera 1, to which the second embodiment is applied. Note that, variables in the flowchart, which are identical in the processing steps, share the same character or the same combination of characters and numeral.

When the power switch is turned to the ON position, from step S600 through step S604, an initialization is carried out. At step S600, the variables $V_2X$, $V_2Y$ are set to "0", and at step S602, the variables $V_{22}X$, $V_{22}Y$ are set to "0", and at step S604, variables $V_{23}X$, $V_{23}Y$ are set to "0". The variables $V_2X$, $V_2Y$, $V_{22}X$ and $V_{22}Y$ are similar to those of the first embodiment. Data of a stop position of the correction lens 101 with respect to the lateral axis is stored in the variables $V_{23}X$, and data of the stop position with respect to the lengthwise axis is stored in the variables $V_{23}Y$.

At step S606, it is checked whether the photometry switch 30 is turned to the ON position in accordance with the pressing of the shutter button 10 by one step. If the photometry switch 30 is not turned to the ON position, the process returns to step S600. Till the photometry switch 30 is turned to the ON position, the initialization from step S600 through step S604 is repeatedly carried out. If the photometry switch 30 is turned to the ON position, the photometry operation is performed, and the process goes to step S608. At step S608, the correction of the focused image tremble is started. In the photometry operation, the photometry value Bv is obtained, the exposure value Ev is calculated, and the controlling amounts of the aperture device 326 and the shutter device 327 are calculated.

Procedures from step S608 through step S614 are similar to the procedures from step S408 through step S412 of FIG. 11 of the first embodiment. Accordingly, the detailed explanation is omitted. After the variable Z, which is the length between the original point on the focal plane and the position of the optical axis OP on the focal plane, is calculated based on the variables $V_2X'$ and $V_2Y'$ at step S614, the process goes to step S616 of FIG. 17.

At step S616, it is checked whether the value of the variable Z is smaller than the radius r10 of FIG. 15. When the variable Z is equal to or smaller than the radius r10, it indicates that the optical axis OP is moved within the correctable range (the first correctable range) of the period in which the film is not exposed. When the variable Z is greater than the radius r10, it indicates that the optical axis OP is moved out of the correctable range of the period in which the film is not exposed.

If it is confirmed at step S616 that the variable Z is equal to or smaller than the radius r10, the process goes to step S618. At step S618, the $V_2X$, in which the current tremble angle in the lateral axis is stored, is copied to the $V_{23}X$, and the $V_2Y$, in which the current tremble angle in the lengthwise axis is stored, is copied to the $V_{23}Y$. The values of the $V_{23}X$ and $V_{23}Y$ are used, when the correction of the focused image tremble is restarted after the release sequence begins.

Subsequently, at step S620, similarly to step S416 of FIG. 11 of the first embodiment, values, of the variables $V_2X'$ and $V_2Y'$ in which each sign of the values are respectively reversed, are copied to the variables $V_{22}X$ and $V_{22}Y$. As described above, the variables $V_{22}X$ and $V_{22}Y$ respectively represent driven positions of the correction lens 101 along the x-axis and the y-axis.

Procedures from step S622 through step S626 are similar to procedures from step S420 through S424 of FIG. 12 of the first embodiment. At step S622, the positional data of the correction lens 101 in the lateral and lengthwise axes, respectively output from the processing circuits 313, 314 are stored in the variables $V_3X$ and $V_3Y$. At step S624, the difference between the variables $V_3X$ and $V_{22}X$ is stored in a variable $V_4X$, and the difference between the variables $V_3Y$ and $V_{22}Y$ is stored in a variable $V_4Y$. At step S626, directions and quantities of driving the correction lens 101 along both the lateral axis and lengthwise axis are calculated based on the values of the variables $V_4X$, $V_4Y$. Signals corresponding to the directions and quantities are respectively output to the driving circuits 321 and 322. Then, current flows through the driving coil 151 in a predetermined direction and by a predetermined magnitude, under the control of the driving circuit 321 based on the value of $V_4X$, and current flows through the driving coil 152 in a predetermined direction and by a predetermined magnitude, under the control of the driving circuit 322 based on the value of $V_4Y$. Consequently, the lens barrel supporting frame 141 is driven.

On the other hand, if it is confirmed at step S616 that the variable Z is greater than the radius r10, namely if it is confirmed that the optical axis OP is moved out of the first correctable range, the process jumps to step S622, without performing the procedures of steps S618 and S620. Namely, while the optical axis OP is moved out of the first correctable range, the values of the variables $V_{22}X$ and $V_{22}Y$ are not updated, and accordingly the values of the variables $V_4X$ and $V_4Y$ are not updated. Therefore, the correction lens 101 is stopped, while the optical axis OP is moved out of the first correctable range, during the photometry operation before the release sequence. Further, as the values of the variables $V_{23}X$ and $V_{23}Y$ are not updated, the values of the variables $V_2X$ and $V_2Y$, at a moment immediately before the correction lens 101 is stopped, are maintained in the variables $V_{23}X$, $V_{23}Y$.

Then, at step S628, it is checked whether the release switch 40 is turned to the ON position by pushing the shutter button 10 by two steps. If it is confirmed that the release switch 40 is turned to the ON position, the process goes to step S700 of FIG. 18. If it is confirmed that the release switch 40 is not ON, the process returns to step S606 of FIG. 16, and the procedures after that are repeatedly performed.

At step S700 of FIG. 10, similar to step S406, the usual release sequence is carried out based on the controlling amount calculated in the photometry operation. At step S702, the values of the variables $V_{23}X$, $V_{23}Y$ are respectively copied to the variables $V_2X$, $V_2Y$. Namely, the variables $V_2X$, $V_2Y$ are respectively set to the values of the tremble angles, saved at step S618 under the condition in which it is confirmed that the focused image tremble is correctable during the photometry period.

Figure 16:
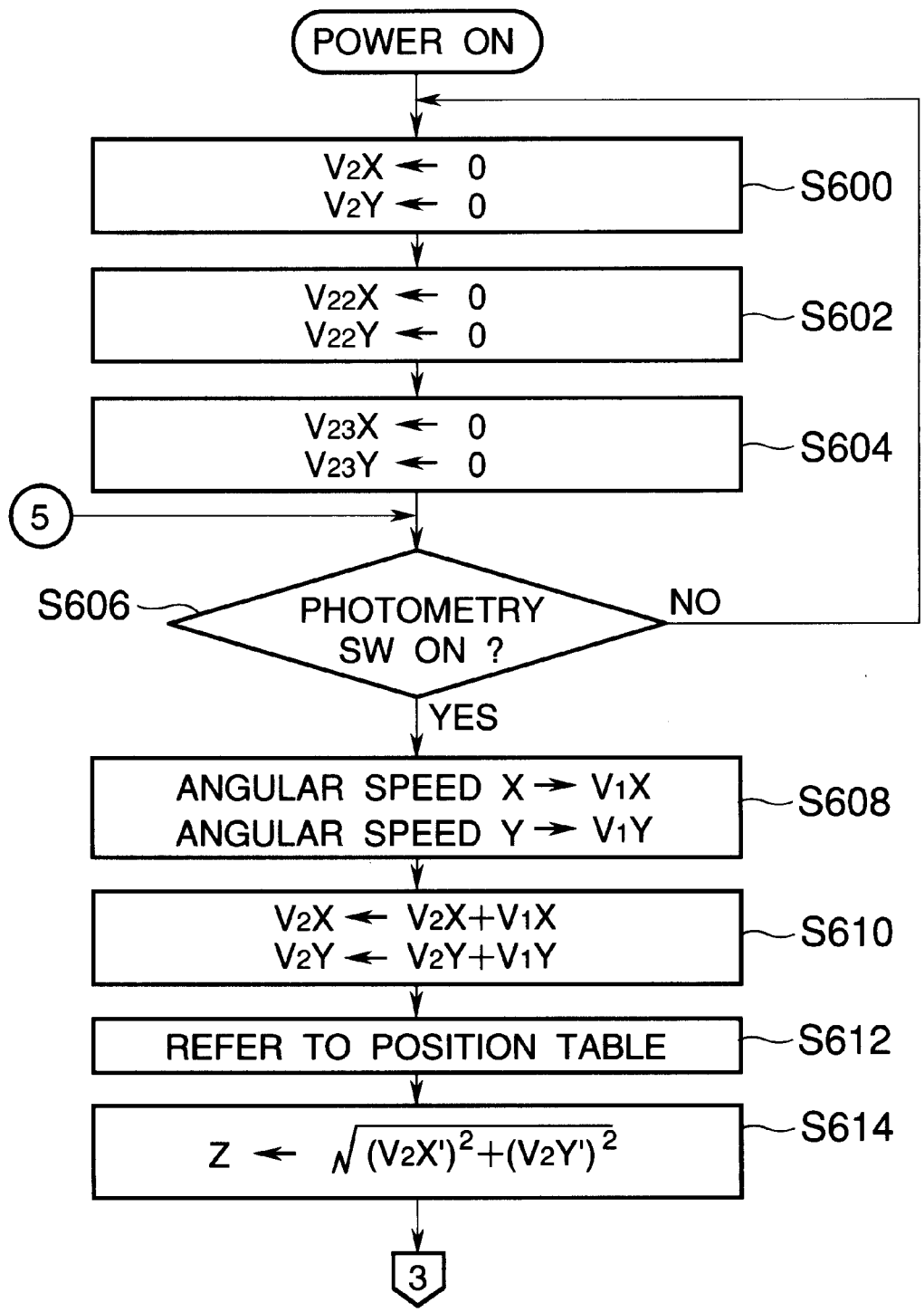
FIG. 16 is a first half of a flowchart indicating procedures during a photometry period of photographing.

Procedures from step S704 through step S710 are similar to the procedures form step S608 through step S614 of FIG. 16. The angular speeds, output from the angular speed sensors 11, 12, are converted to the digital values (S704), and the angular data ($V_2X$, $V_2Y$) is calculated by integrating the digital values (S706). Referring to the tremble position table of the EEPROM 340 based on the angular data, the positional data of the optical axis OP on the focal plane is obtained with respect to the lateral and lengthwise axes, and the positional data is stored in the variables $V_2X'$ and $V_2Y'$ (S708). The length between the position of the optical axis OP on the focal plane and the original point (the center of the focal plane) is calculated based on the values of the variable $V_2X'$ and $V_2Y'$, and the length is stored in the variable Z (S710).

If the focused image tremble stays at all times within the first correctable range of the correction lens 101 during the photometry period, the tremble angles, at the moment before the release sequence begins, are stored in the variables V23X, V23Y by the procedure of step S618. Accordingly, by copying the values of the variables $V_{23}X$ and $V_{23}Y$ to the variables $V_2X$ and $V_2Y$ at step S702, after the release sequence begins, the calculation of the tremble angles are continuously carried out from the calculation before the release sequence.

Further, when the focused image tremble is moved out of the first correctable range of the correction lens 101 during the photometry period, the tremble angles, at the moment immediately before the optical axis OP is moved out of the first correctable range, are stored in the variables $V_{23}X$ and $V_{23}Y$ by the procedure of step S618. Accordingly, the calculation of the tremble angle in the release sequence is started from the position at which the correction lens 101 was stopped during the photometry period.

Subsequently, at step S712, it is checked whether the value of the variable Z is greater than the radius r11. When the variable Z is equal to or smaller than the radius r11, it indicates that the optical axis OP is moved within the correctable range (the second correctable range) of the correction lens 101 in the exposure period. When the variable Z is greater than the radius r11, it indicates that the optical axis OP is moved out of the second correctable range of the correction lens 101. Namely, after the release switch 40 is turned to the ON position, and the release sequence is started, the correctable range of the correction lens 101 is enlarged from the circle D, the radius of which is r10, to the circle C, the radius of which is r11, by the operation of step S712.

If it is confirmed at step S712 that the variable Z is equal to or smaller than the radius r11, the process goes to step S714. At step S714, values, of the variables $V_2X'$ and $V_2Y'$ in which each sign of the values are respectively reversed, are copied to the variables $V_{22}X$ and $V_{22}Y$.

Procedures from step S716 through step S720 are similar to the procedures from step S622 through step S626. The positional data of the correction lends 101 in the lateral and lengthwise axes, respectively output from the processing circuits 313, 314 are stored in the variables $V_3X$ and $V_3Y$ (S716). Based on the positional data of the correction lens 101 in the lateral and lengthwise axes, with respect to the lateral and lengthwise axes, the differences are calculated between the present position of the correction lens 101 and the position to which the correction lens 101 should be moved for correcting the focused image tremble (S718). The directions and quantities of driving the correction lens 101 along both the lateral axis and lengthwise axis are calculated based on the differences; the signals corresponding to the directions and quantities are respectively output to the driving circuits 321 and 322; the current flows through each of the driving coils 151 and 152 in predetermined direction and by a predetermined magnitude, under the control of the driving circuit 321 based on the signals; the lens barrel supporting frame 141 is driven (S720).

On the other hand, it is confirmed at step S712 that the variable Z is greater than the radius r11 and the optical axis OP is moved out of the second correctable range of the correction lens 101, the process jumps to step S714 without performing the procedure of step S714.

Namely, while the optical axis OP is moved out of the second correctable range, the values of the variables $V_{22}X$ and $V_{22}Y$ are not updated, and accordingly the values of the variables $V_4X$ and $V_4Y$ are not updated at step S718. Therefore, the correction lens 101 is stopped, while the optical axis OP is moved out of the second correctable range, during the exposure period.

At step S722, it is checked whether the exposure period is elapsed. If it is determined that the exposure period still continues, the process returns to step S704. If it is confirmed that the exposure period is elapsed, the process goes to step S724 of FIG. 19. Namely, during the exposure period, the procedures from step S704 through step S722 are repeatedly performed, carrying out the correction of the focused image tremble.

Procedures from step S724 through step S730 are similar to the procedures from step S428 through step S434. Namely, the ending operation is carried out.

As described above, according to the second embodiment, the first correctable range in the photometry period is defined to be smaller than the second correctable range in the exposure period. Further, the correction of the focused image tremble is stopped at a moment at which the focused image tremble becomes out of the first correctable range during the photometry period, and when the release sequence begins, the correction of the focused image tremble is restarted from the position at which the correction lens 101 is stopped.

Accordingly, a range in which the correction lens 101 is able be driven, is maintained, as the correction lens 101 is started to be driven from a position close to the boundary of the first correctable range even if the release sequence begins in the situation that the practical focused image tremble is close to the boundary of the second correctable range. Therefore, a high quality of a photographed image is achieved, because the correction of the focused image tremble is more effectively carried out during the exposure period, than a case in which during the photometry period with correction lens 101 is driven without the second correctable range.

Figure 17:
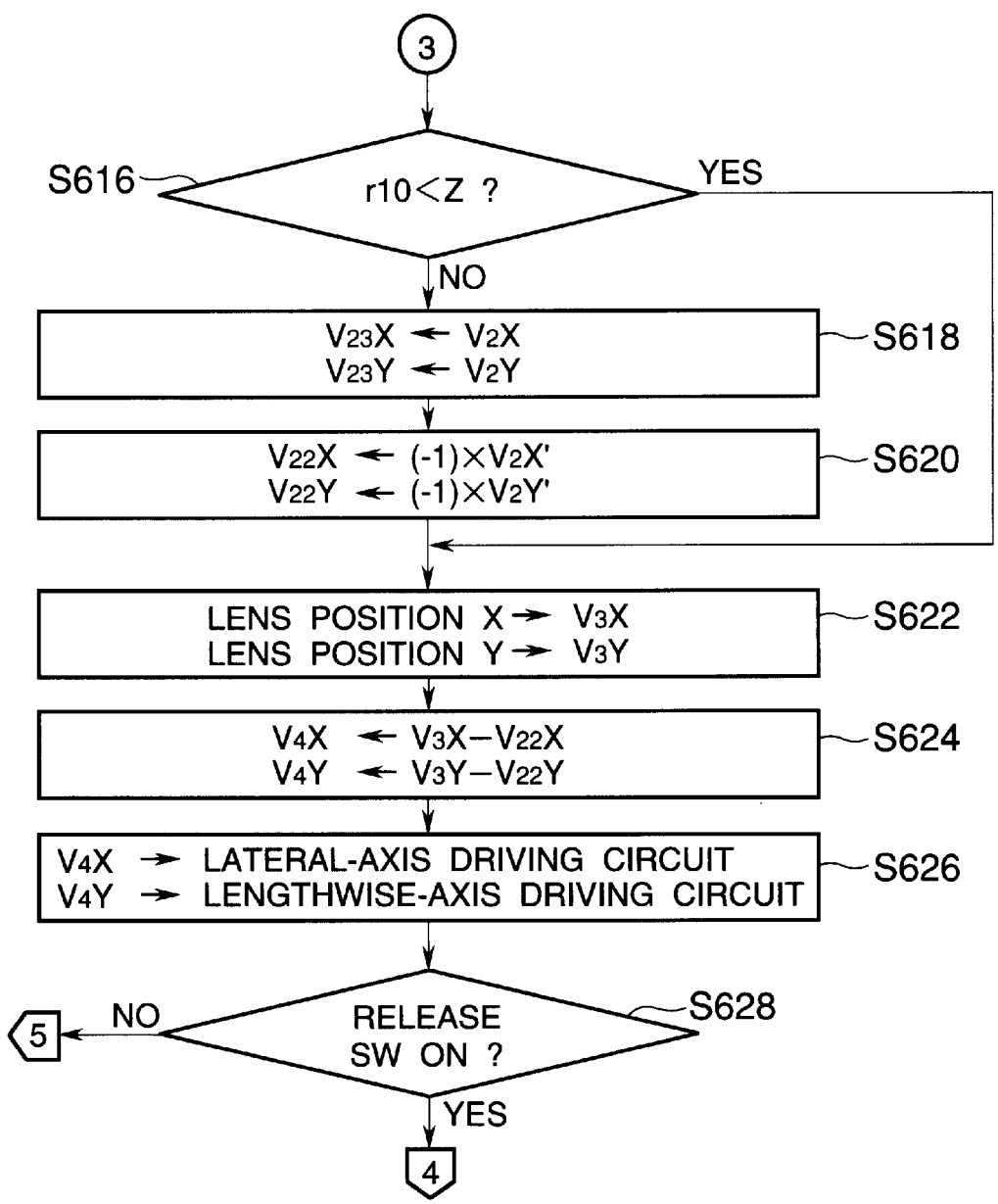
FIG. 17 is a latter half of the flowchart indicating the procedures during the photometry period of the photographing.
Figure 20:
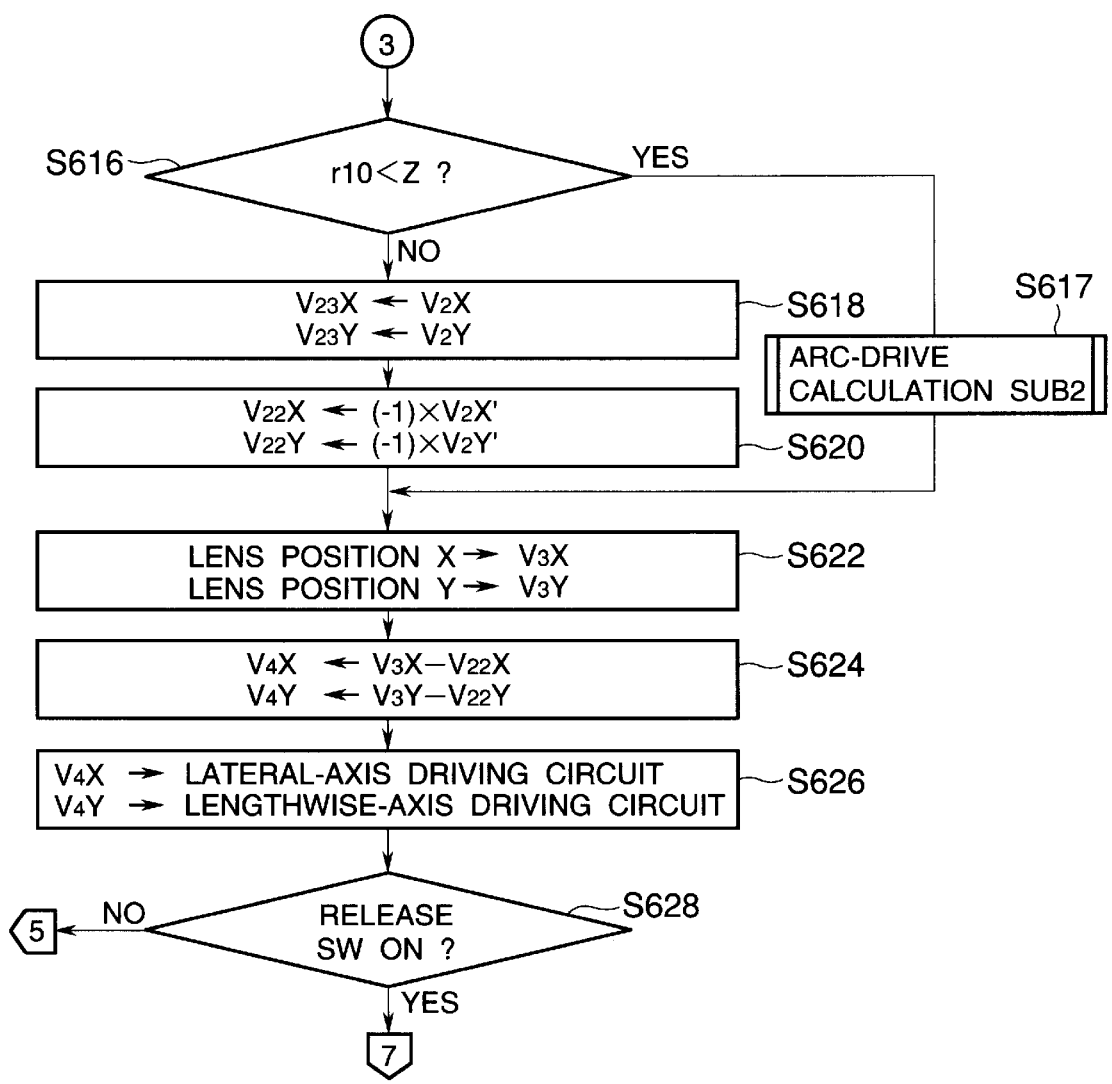
FIG. 20 is a latter half of the flowchart indicating the procedure during the photometry period of the photographing, in a modification of the second embodiment.
Figure 21:
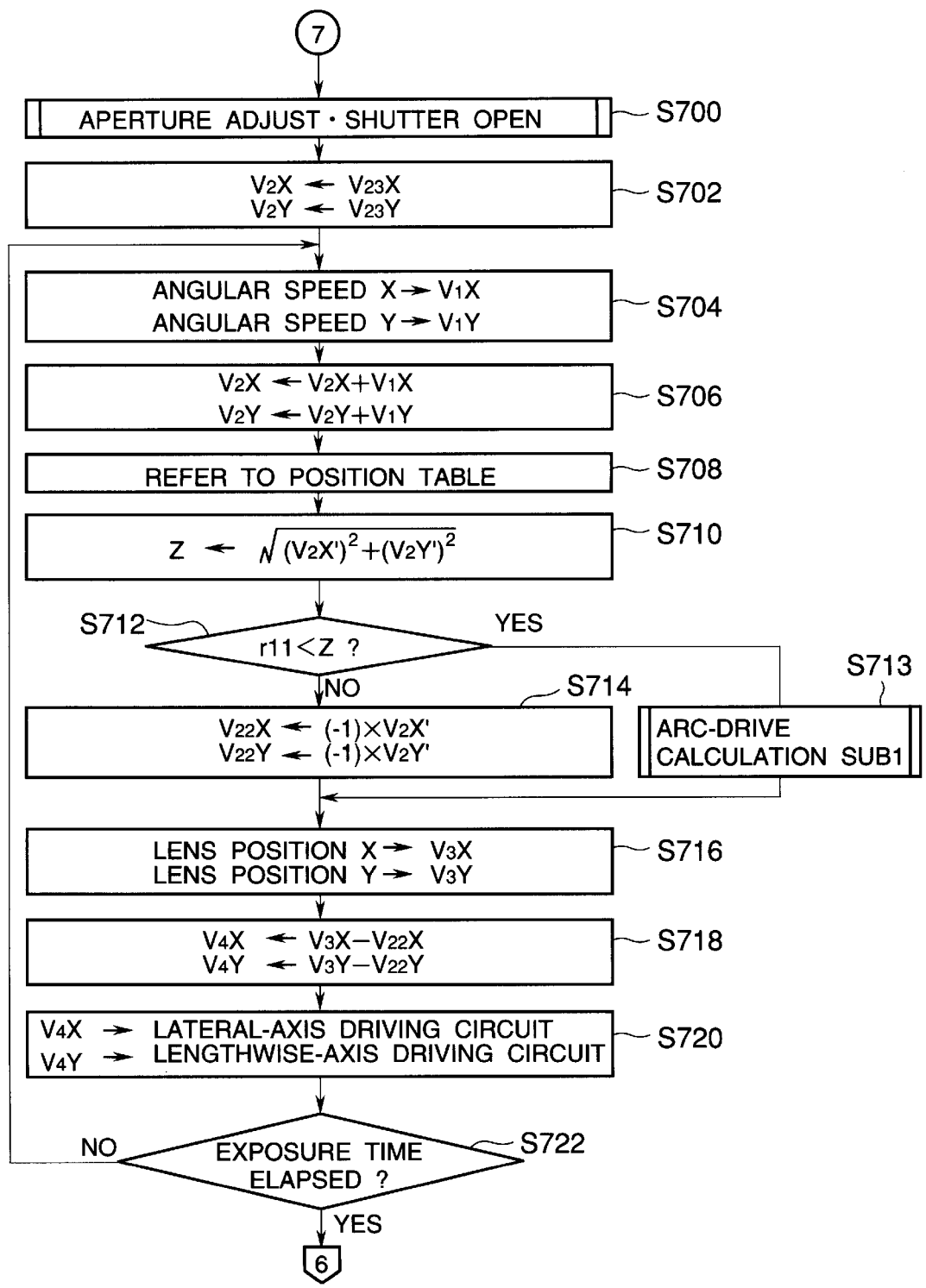
FIG. 21 is a flowchart indicating procedures during the exposure period of the photographing, in the modification of the second embodiment.
Figure 22:
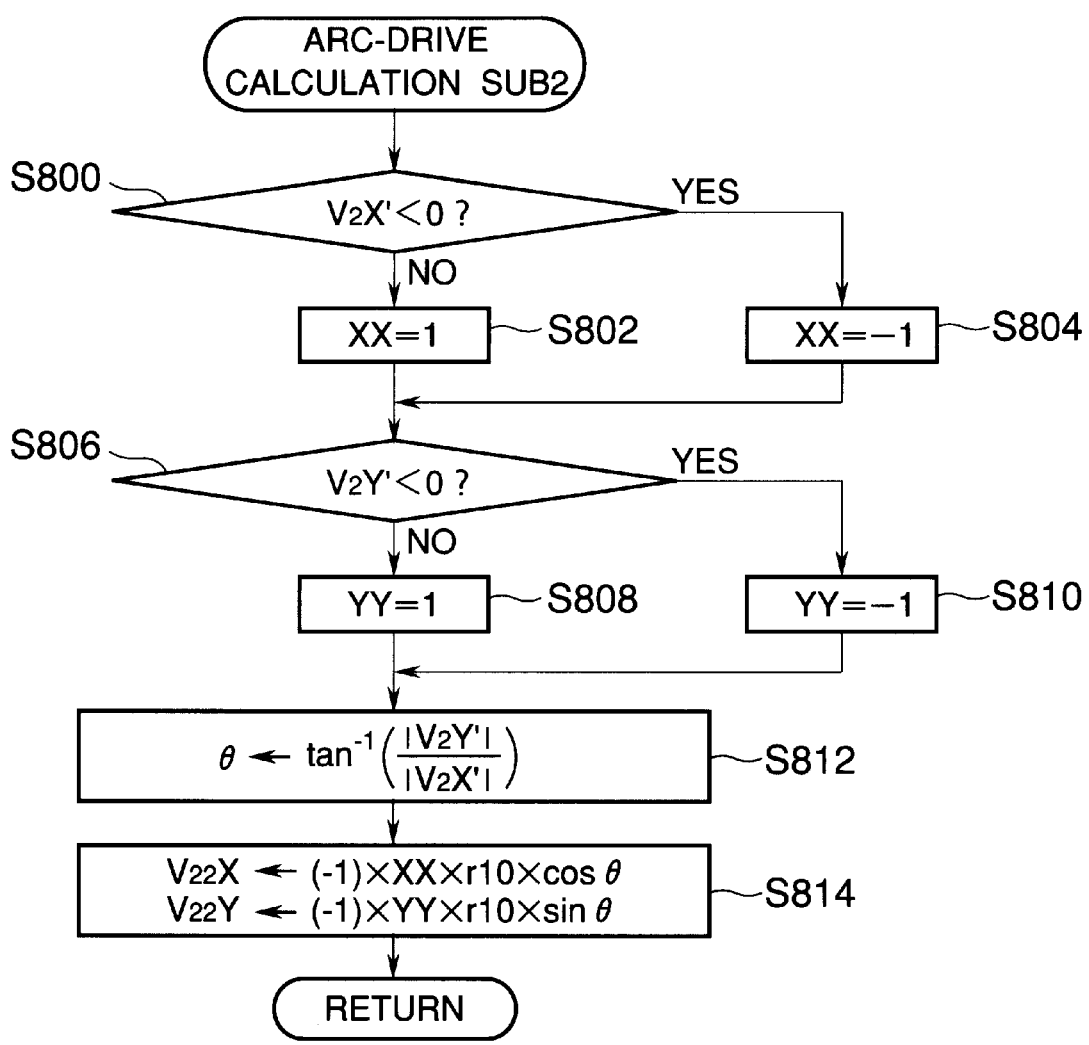
FIG. 22 is a flowchart of procedures of an arc-drive calculation subroutine 2.

Referring now to FIGS. 20, 21 and 22, a modification of the second embodiment will be explained. Similar to FIG. 17, FIG. 20 is the latter half of the flowchart indicating the procedures during the photometry period of the photographing. At step S616, if it is confirmed that the variable Z is greater than the radius r10, the process goes to step S617. At step S617, an arc-drive calculation, which is almost identical to that of the first embodiment, is carried out. Namely, an arc-driven-calculation subroutine 2 of FIG. 22 is invoked.

As shown in FIG. 22, procedures from step S800 through step S812 are similar to the procedures from step S500 through step S512 of the arc-drive-calculation subroutine 1 of the first embodiment indicated in FIG. 13. At step S814, the x-coordinate and y-coordinate, of the intersection of the correctable range circle D and the line connecting the position of the optical axis OP on the focal plane and the original point, is calculated, using the values of the variable θ calculated at step S812, the flags XX and YY, and the radius r10 of the circle D. Accordingly, the correction lens 101 is moved on the arc of the circle D, while the optical axis OP is moved out of the first correctable range during the photometry period.

Figure 18:
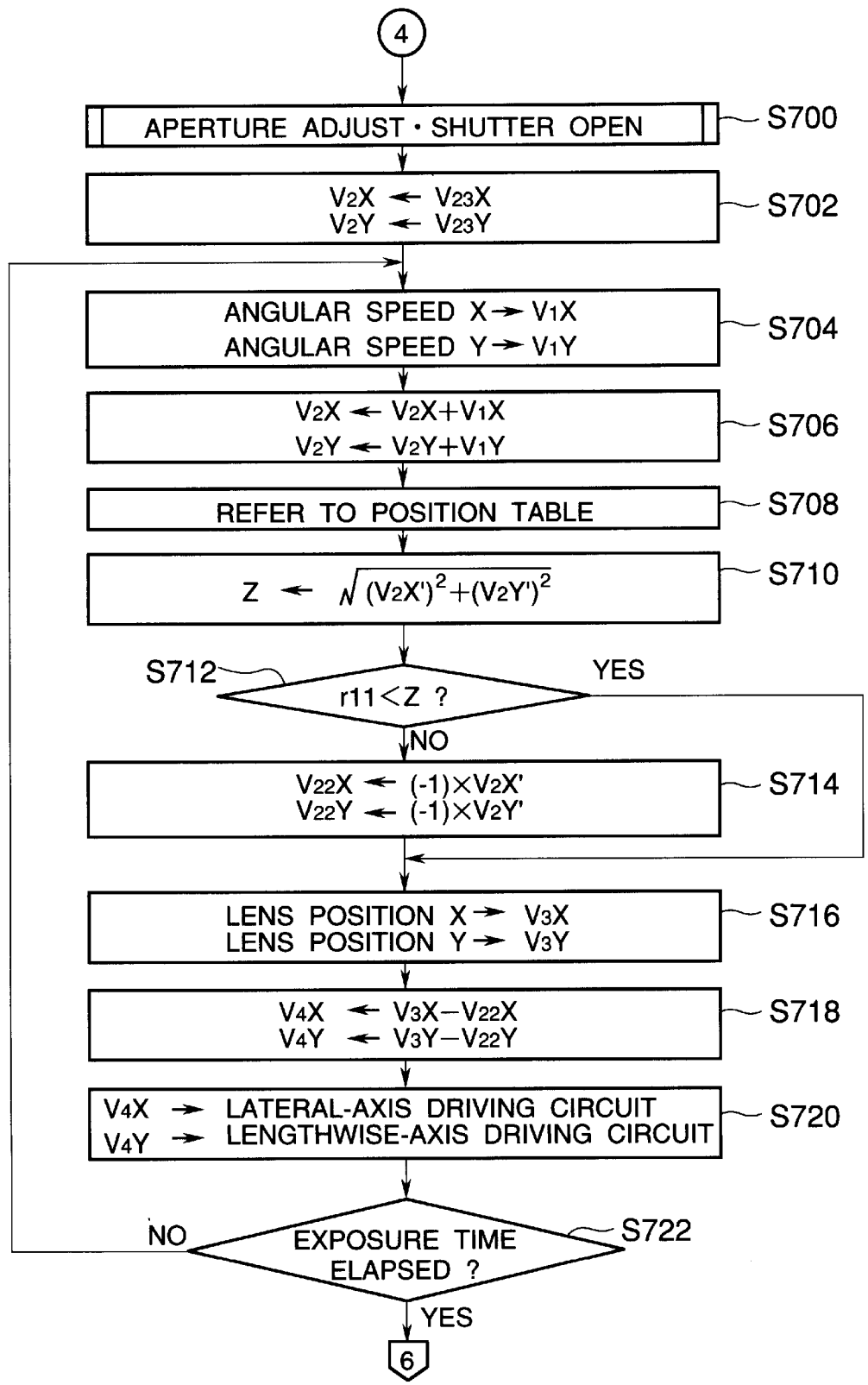
FIG. 18 is a flowchart indicating procedures during an exposure period of the photographing.
Figure 19:
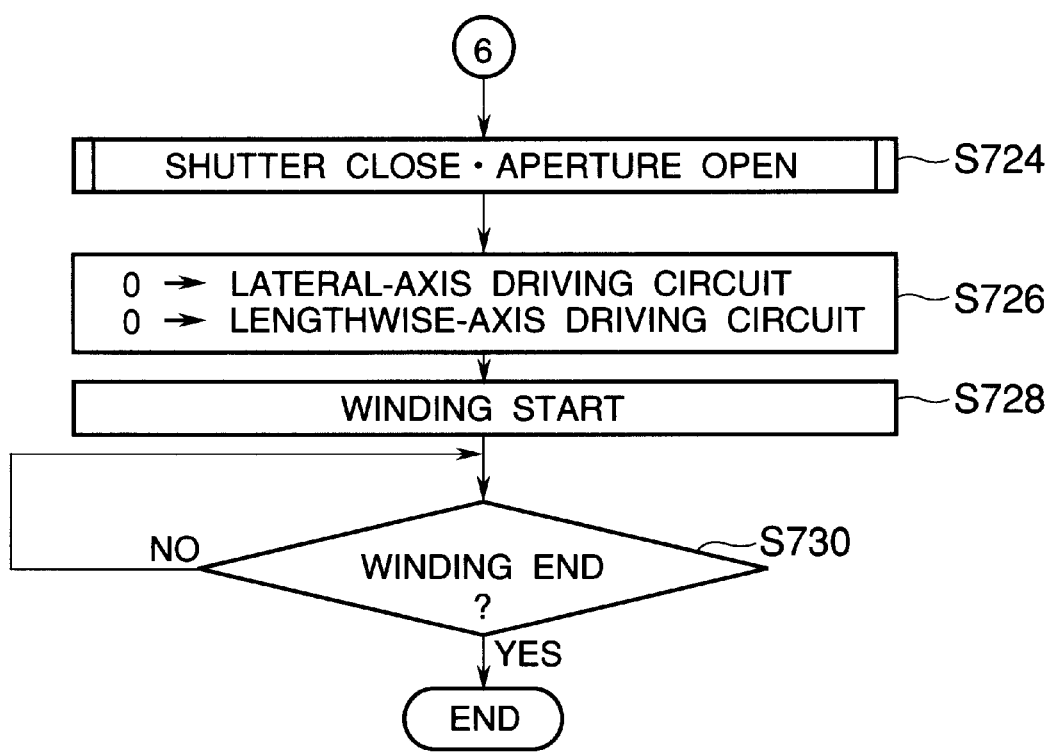
FIG. 19 is a flowchart indicating an ending of the photographing.

Similar to FIG. 18, FIG. 21 is a flowchart indicating procedures during the exposure period of the photographing. At step S712, if it is confirmed that the variable Z is greater than the radius r11, the process goes to step S713. At step S713, the arc-drive calculation of the first embodiment, is carried out. Namely, the arc-drive-calculation subroutine 1 of FIG. 13 is invoked. Accordingly, the correction lens 101 is moved on the arc of the circle C, while the optical axes OP is moved out of the second correctable range during the exposure period.

Namely, in the modification of the second embodiment, during both the photometry period and the exposure period, in other words under both the standby state and the photographing state, when the position of the optical axis OP comes back within the corresponding correctable range and the true correction of the focused image tremble is restarted, the correction lens 101 starts following the positional change of the optical axis OP in an instant, preventing a time delay.

Note that, the second embodiment can be applied to a digital camera in which an object image is subjected to photoelectric conversion of an image sensor, for example a CCD sensor and so on, to be recorded. In a digital camera, while the accumulation of the charge corresponding to the object image is not being performed, namely while a shuttering operation is not being carried out, the CPU 300 controls the driving of the correction lens 101 within the first correctable range, and while the accumulation of the charge corresponding to the object image is being performed, namely while the shuttering operation is being carried out, the CPU 300 controls the driving of the correction lens 101 within the second correctable range. Namely, the correction of the focused image tremble is controlled such that the correctable range except during the shuttering operation is smaller than the correctable range during the shuttering operation.

Further, the first and the second embodiments can be applied to other photographing devices. For example, if the second embodiment is applied to a video camera, under the standby state, the correctable range is set to the first correctable range, and under the photographing state, the correctable range is set to the second correctable range. Furthermore, the first embodiment can be applied to other optional devices, for example, a pair of binoculars.

According to the present invention, in a device for correcting the focused image tremble, the correction is restarted in an instant when the focused image tremble returns within the correctable range.

Further, according to the present invention, in a device for correcting the focused image tremble, the effectiveness of the correction is sustained during a period of recording an object image even if a large focused image tremble occurs while the object image is not being recorded.

The present disclosure relates to subject matters contained in Japanese Patent Application No. P11-102844 (filed on Apr. 9, 1999) and No. P11-104027 (filed on Apr. 12, 1999) which are expressly incorporated herein, by reference, in their entireties.

What is claimed is:

1. A device for correcting a tremble of a focused image, for a camera including a photographing optical system, and a photographing control system which records an optical image, formed on a photographing medium, on said photographing medium by controlling an image capturing operation, said device comprising:

a tremble detector that detects a direction and a quantity of a tremble of the camera;

a correction optical system that is included in the photographing optical system and corrects a tremble of said optical image;

a driving device that drives said correction optical system;

a tremble position detector that detects a tremble position on a focal plane, through which an optical axis of another optical system included in the photographing optical system extends and on which said optical image is formed by the photographing optical system, said tremble position being moved in accordance with said tremble of the camera, said optical axis of said other optical system extending through a center of said focal plane, when an optical axis of said correction optical system is positioned at an original point at which said optical axis of said correction optical system is coaxial with said optical axis of said other optical system; and a controlling system that calculates driving data of said correction optical system based on said tremble position in order to cancel said tremble, and controls said driving device based on said driving data;

wherein said controlling system controls said driving device such that a first correctable range, of said correction optical system on said focal plane when the camera is in a standby state, is smaller than a second correctable range, of said correction optical system on said focal plane when the camera is in an image capturing state.

2. The device is claim 1, wherein said second correctable range is defined as an area bonded by a trace made by driving said correction optical system so as to be positioned as far as possible from said original point.

3. The device of claim 2, wherein said second correctable range is set to be smaller than a range, a boundary of which is defined by a trace of positions at which a supporting member of said correction optical system is not movable, being in contact with other members of said camera.

4. The device of claim 3, wherein said first correctable range and said second correctable range are a circle, a center of which is said original point.

5. The device of claim 1, wherein if said tremble is out of said first correctable range when the camera is in said first state, said correction optical system is stopped, and driving of said correction optical system is restarted for correcting said tremble from a position of which said correction optical system was stopped, when said image capturing operation begins.

6. The device of claim 1, wherein said photographing control system further comprises a photometric device that carries out a photometric operation in accordance with an operation of an operating member mounted on said camera, and said correction optical system is driven within said first correctable range during a period in which said photometric operation is being carried out.

7. The device of claim 1, wherein said judging system judges wherein said trouble position is within said correctable ranges by comparing a distance between said tremble position and said original point with a radius of said circle.

* * * * *